United States Patent
Yamazaki et al.

(10) Patent No.: US 9,464,674 B2
(45) Date of Patent: *Oct. 11, 2016

(54) FIXED TYPE CONSTANT VELOCITY UNIVERSAL JOINT

(71) Applicants: Kisao Yamazaki, Shizuoka (JP); Kenta Yamazaki, Shizuoka (JP); Hiroyasu Hirukawa, Shizuoka (JP)

(72) Inventors: Kisao Yamazaki, Shizuoka (JP); Kenta Yamazaki, Shizuoka (JP); Hiroyasu Hirukawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/362,659

(22) PCT Filed: Nov. 16, 2012

(86) PCT No.: PCT/JP2012/079832
§ 371 (c)(1),
(2) Date: Jun. 4, 2014

(87) PCT Pub. No.: WO2013/088905
PCT Pub. Date: Jun. 20, 2013

(65) Prior Publication Data
US 2014/0329608 A1 Nov. 6, 2014

(30) Foreign Application Priority Data
Dec. 15, 2011 (JP) ................................. 2011-274436

(51) Int. Cl.
*F16D 3/223* (2011.01)
*F16D 3/24* (2006.01)
*F16D 3/2233* (2011.01)
*F16D 3/224* (2011.01)

(52) U.S. Cl.
CPC ................ *F16D 3/24* (2013.01); *F16D 3/224* (2013.01); *F16D 3/2233* (2013.01); *F16D 2003/22306* (2013.01); *Y10S 464/906* (2013.01)

(58) Field of Classification Search
CPC ........ F16D 3/24; F16D 3/224; F16D 3/2233; F16D 2003/22306; F16D 2003/22309; Y10S 464/906

USPC .................................................. 464/144, 906
See application file for complete search history.

(56) References Cited

U.S. PATENT DOCUMENTS 6,319,133 B1    11/2001  Schwärzler et al.
9,163,672 B2 *  10/2015  Yamazaki ............. F16D 3/2233
(Continued)

FOREIGN PATENT DOCUMENTS

CN          1248316         3/2000
CN          101517255       8/2009
(Continued)

OTHER PUBLICATIONS

International Preliminary Report on Patentability and Written Opinion of the International Searching Authority issued Jun. 26, 2014 in International (PCT) Application No. PCT/JP2012/079832.
(Continued)

*Primary Examiner* — Gregory Binda
(74) *Attorney, Agent, or Firm* — Wenderoth, Lind & Ponack, L.L.P.

(57) ABSTRACT

In a fixed type constant velocity universal joint, track grooves of an outer joint member include first track groove portions positioned on an interior side and second track groove portions positioned on an opening side. The first track groove portions each have an arc-shaped ball raceway center line having a curvature center that is prevented from being offset in an axial direction of the outer joint member with respect to a joint center. Planes each including at least the ball raceway center line and the joint center are inclined with respect to a joint axial line with their inclination directions alternately opposite to each other in the first track groove portions that are adjacent to each other in a peripheral direction of the outer joint member.

19 Claims, 22 Drawing Sheets

(56) References Cited

U.S. PATENT DOCUMENTS

| | | |
|---|---|---|
| 2001/0046900 A1 | 11/2001 | Song |
| 2010/0029396 A1 | 2/2010 | Fujio et al. |
| 2010/0113167 A1 | 5/2010 | Weckerling et al. |
| 2010/0292016 A1 | 11/2010 | Wormsbaecher et al. |
| 2010/0323802 A1 | 12/2010 | Weckerling et al. |
| 2012/0165105 A1 | 6/2012 | Fujio et al. |
| 2014/0243104 A1* | 8/2014 | Yamazaki ............. F16D 3/2233 464/145 |
| 2015/0240878 A1* | 8/2015 | Yamazaki ............... F16D 3/223 464/145 |

FOREIGN PATENT DOCUMENTS

| | | |
|---|---|---|
| CN | 101542149 | 9/2009 |
| CN | 101627218 | 1/2010 |
| JP | 2004-332815 | 11/2004 |
| JP | 2007-218353 | 8/2007 |
| JP | 2008-69889 | 3/2008 |
| JP | 2009-250365 | 10/2009 |
| WO | 01/61203 | 8/2001 |
| WO | 2011/043268 | 4/2011 |

OTHER PUBLICATIONS

International Search Report issued Jan. 15, 2013 in International (PCT) Application No. PCT/JP2012/079832.
Chinese Office Action issued Nov. 25, 2015 in counterpart Chinese Patent Application No. 201280061839.5 with English translation.
Extended European Search Report issued Jul. 5, 2016 in corresponding European Application No. 12858265.7.

* cited by examiner

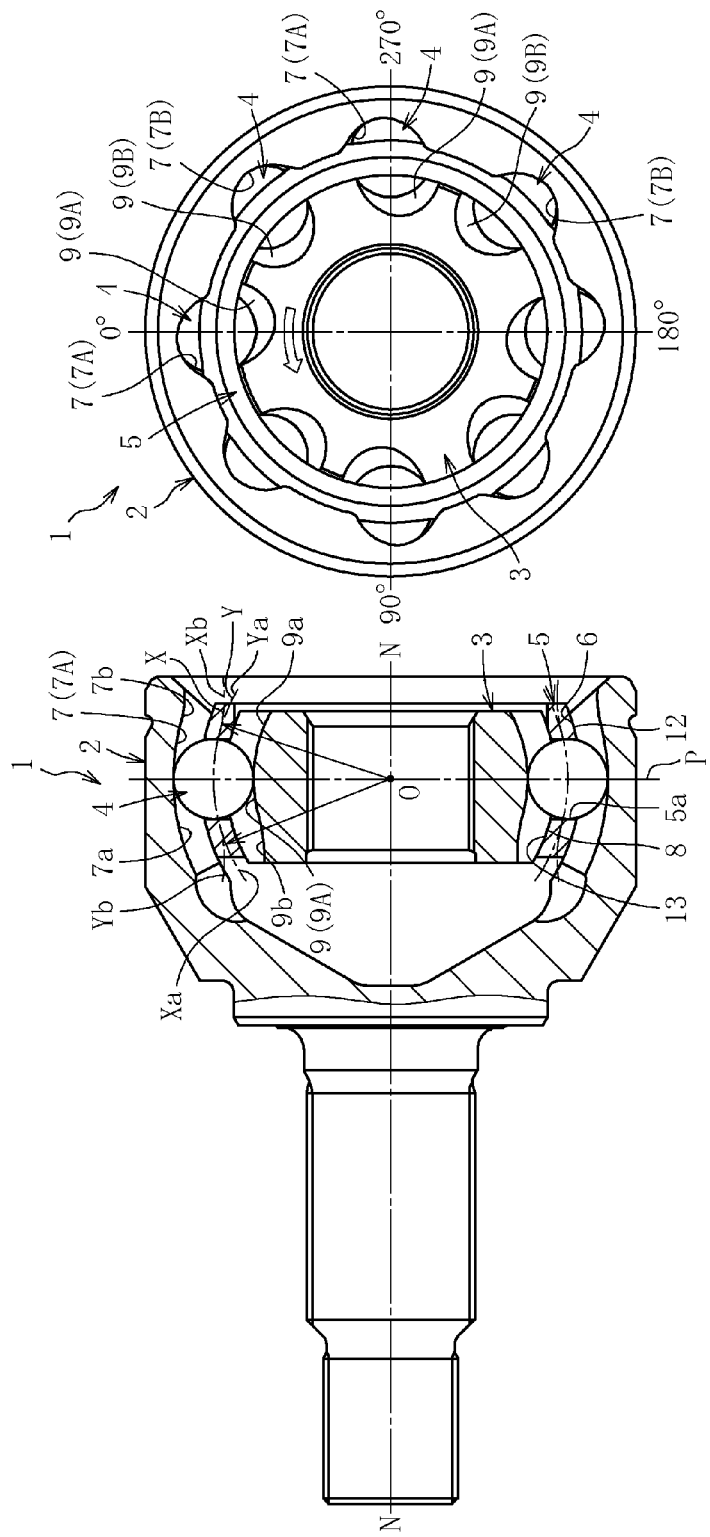

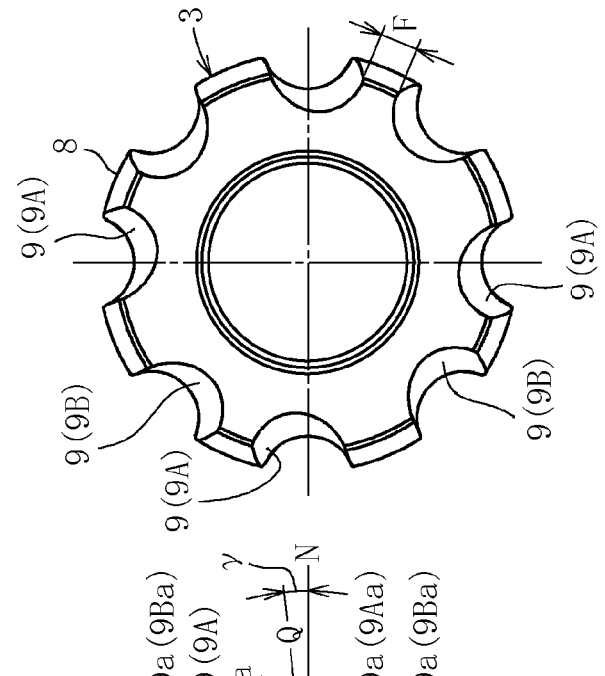
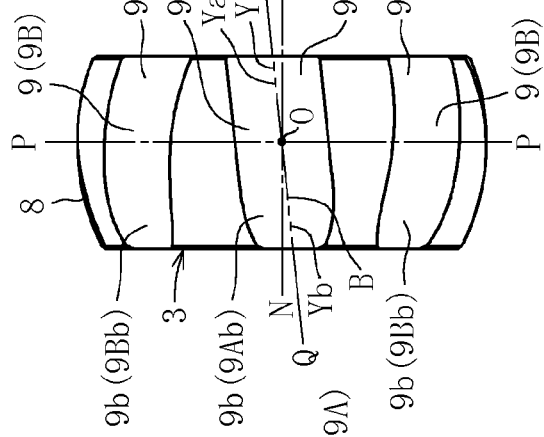
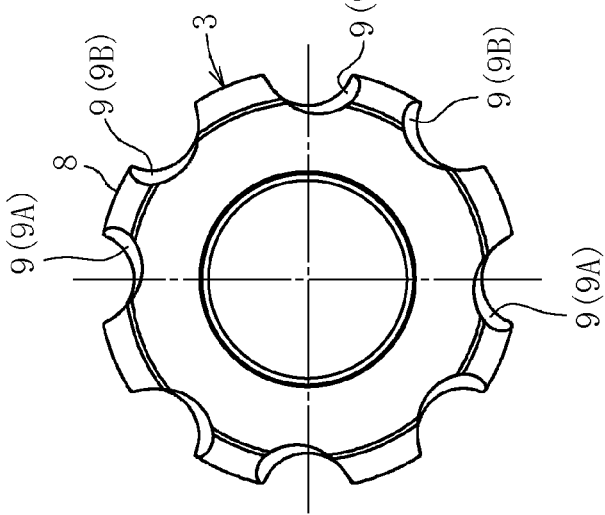

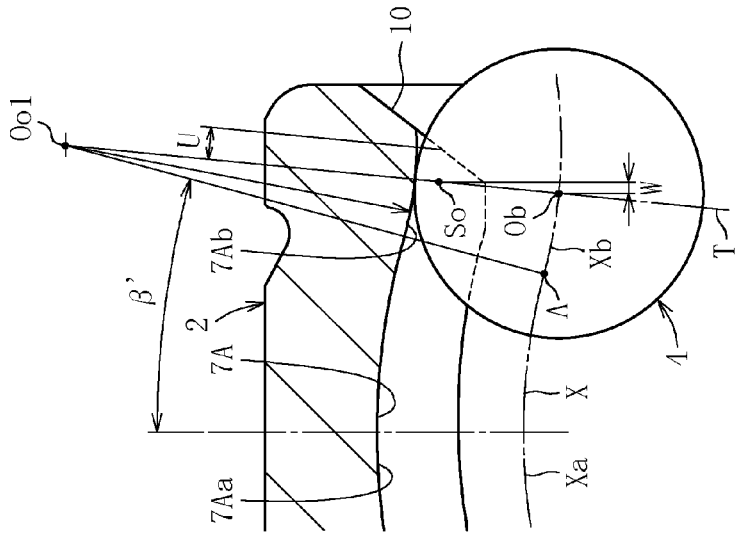
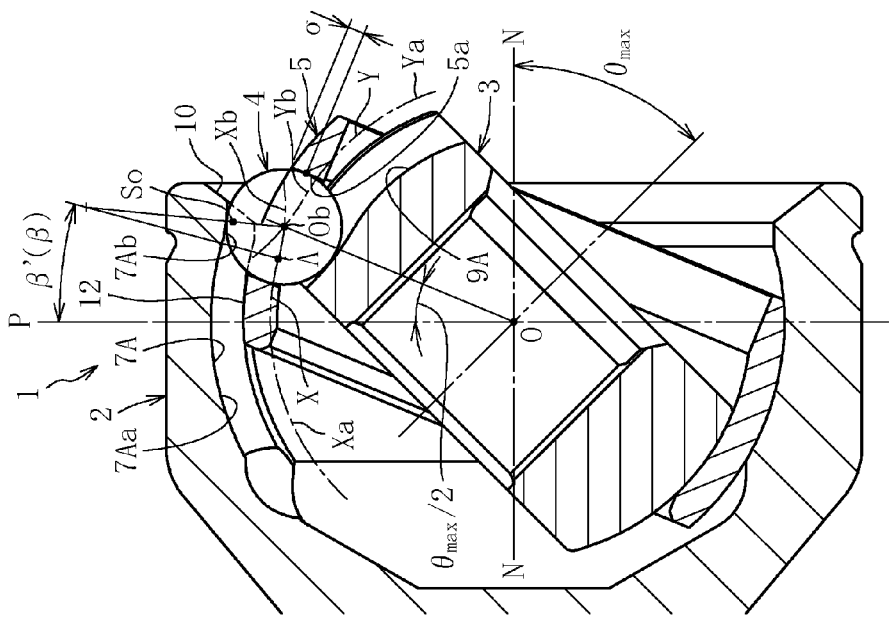
Fig. 7a
Fig. 7b

FIXED TYPE CONSTANT VELOCITY UNIVERSAL JOINT

TECHNICAL FIELD

The present invention relates to a fixed type constant velocity universal joint, and more specifically, to a fixed type constant velocity universal joint to be used in a power transmission system of automobiles and various industrial machines, for allowing only angular displacement between two shafts on a driving side and a driven side.

BACKGROUND ART

For example, a plunging type constant velocity universal joint capable of allowing axial displacement while forming an operating angle including a relatively low maximum operating angle is generally assembled on an inboard side (differential side) of an automotive front drive shaft. On an outboard side (wheel side) thereof, a fixed type constant velocity universal joint capable of forming high operating angles while avoiding axial displacement is assembled in consideration of steering of the wheel.

FIG. 25 illustrate a Rzeppa type constant velocity universal joint 101 as an example of the fixed type constant velocity universal joint to be used on the outboard side. FIG. 25a is a vertical sectional view of a state in which an operating angle is 0°, and FIG. 25b is a schematic view of a state in which a maximum operating angle is formed. As illustrated in FIG. 25a, the constant velocity universal joint 101 mainly includes an outer joint member 102, an inner joint member 103, balls 104, and a cage 105. Eight track grooves 107 are formed equiangularly in a spherical inner peripheral surface 106 of the outer joint member 102 so as to extend along an axial direction. Track grooves 109 opposed to the track grooves 107 of the outer joint member 102 are formed equiangularly in a spherical outer peripheral surface 108 of the inner joint member 103 so as to extend along the axial direction. The eight balls 104 for transmitting torque are interposed between the track grooves 107 of the outer joint member 102 and the track grooves 109 of the inner joint member 103, respectively. The cage 105 for holding the balls 104 is arranged between the spherical inner peripheral surface 106 of the outer joint member 102 and the spherical outer peripheral surface 108 of the inner joint member 103. An outer periphery of the outer joint member 102 and an outer periphery of a shaft coupled to the inner joint member 103 are covered with a boot, and grease is sealed inside the joint as a lubricant (not shown).

As illustrated in FIG. 25a, the cage 105 has a spherical outer peripheral surface 112 fitted to the spherical inner peripheral surface 106 of the outer joint member 102, and a spherical inner peripheral surface 113 fitted to the spherical outer peripheral surface 108 of the inner joint member 103. The spherical outer peripheral surface 112 and the spherical inner peripheral surface 113 each have a curvature center formed at a joint center O. On the other hand, a curvature center Oo of a ball raceway center line x of each track groove 107 of the outer joint member 102 and a curvature center Oi of a ball raceway center line y of each track groove 109 of the inner joint member 103 are offset in the axial direction by equal distances with respect to the joint center O. Therefore, when the joint forms an operating angle, the balls 104 are always guided in a plane bisecting an angle formed between axial lines of the outer joint member 102 and the inner joint member 103. As a result, rotational torque is transmitted at a constant velocity between the two axes.

As illustrated in FIG. 25b, a maximum operating angle $\theta_{max}$, which is defined as a main function of the fixed type constant velocity universal joint 101, depends on an angle causing interference between an inlet chamfer 110 provided at an opening rim of the outer joint member 102 and a shaft 111. In order to secure permissible torque to be transmitted, an axial diameter d of the shaft 111 is determined for each joint size. When a large inlet chamfer 110 is formed, the length of each track groove 107 of the outer joint member 102, on which the ball 104 is brought into abutment (hereinafter referred to as "effective track length"), is insufficient. As a result, the ball 104 may drop off the track groove 107, and the rotational torque cannot be transmitted. Therefore, how the inlet chamfer 110 is formed while securing the effective track length of the outer joint member 102 is an important factor in securing the operating angle. In the Rzeppa type constant velocity universal joint 101, the curvature center Oo of the ball raceway center line x of the track groove 107 of the outer joint member 102 is offset to an opening side, and hence there is an advantage in terms of the maximum operating angle. However, the maximum operating angle $\theta_{max}$ is approximately 47°.

Further, as compared to a related-art six-ball constant velocity universal joint, the Rzeppa type constant velocity universal joint 101 of an eight-ball type has a smaller track offset amount, a larger number of balls, and has a smaller diameter. Thus, it is possible to attain a highly efficient constant velocity universal joint that is lightweight and compact, and is suppressed in torque loss. However, at an operating angle of 0°, wedge angles formed between the opposing track grooves 107 and 109 of the outer joint member 102 and the inner joint member 103 are opened toward the opening side of the outer joint member 102. Therefore, due to axial forces applied from the track grooves 107 and 109 to the balls, loads to be applied to the spherical contact portions 106 and 112 of the outer joint member 102 and the cage 105 and the spherical contact portions 108 and 113 of the inner joint member 103 and the cage 105 are generated in a certain direction. Thus, this structure leads to restriction on achieving even higher efficiency and less heat generation.

In order to achieve even higher efficiency and less heat generation than those can be achieved by the above-mentioned Rzeppa type constant velocity universal joint 101 of the eight-ball type, a fixed type constant velocity universal joint of a track groove crossing type has been proposed (Patent Document 1). FIGS. 26 and 27 illustrate this constant velocity universal joint. FIG. 26 is a vertical sectional view of a state in which the operating angle is 0°, and FIG. 27 are views of a state in which a high operating angle is formed. As illustrated in FIG. 26, a constant velocity universal joint 121 mainly includes an outer joint member 122, an inner joint member 123, balls 124, and a cage 125. The constant velocity universal joint 121 is a constant velocity universal joint of the track groove crossing type. Although illustration is omitted, planes including ball raceway center lines x of eight track grooves 127 of the outer joint member 122 are inclined with respect to a joint axial line n-n with their inclination directions opposite to each other in the track grooves 127 adjacent to each other in a peripheral direction. In addition, each track groove 129 of the inner joint member 123 has a ball raceway center line y, which is formed so as to be mirror-image symmetrical with the ball raceway center line x of the paired track groove 127 of the outer joint member 122 with respect to a plane P including a joint center O at the operating angle of 0°.

In the vertical cross section illustrated in FIG. 26, the track groove 127 formed in a spherical inner peripheral surface 126 of the outer joint member 122 extends into an arc shape along the axial direction, and a curvature center of the track groove 127 is positioned at the joint center O. In a spherical outer peripheral surface 128 of the inner joint member 123, the track groove 129 opposed to the track groove 127 of the outer joint member 122 extends into an arc shape along the axial direction, and a curvature center of the track groove 129 is positioned at the joint center O. The eight balls 124 for transmitting torque are interposed in crossing portions between the track grooves 127 of the outer joint member 122 and the track grooves 129 of the inner joint member 123. The cage 125 for holding the balls 124 is arranged between the spherical inner peripheral surface 126 of the outer joint member 122 and the spherical outer peripheral surface 128 of the inner joint member 123. The cage 125 has a spherical outer peripheral surface 132 fitted to the spherical inner peripheral surface 126 of the outer joint member 122, and a spherical inner peripheral surface 133 fitted to the spherical outer peripheral surface 128 of the inner joint member 123. The spherical outer peripheral surface 132 and the spherical inner peripheral surface 133 each have a curvature center formed at the joint center O. In the constant velocity universal joint 121, curvature centers of the ball raceway center lines x and y of the respective track grooves 127 and 129 of the outer joint member 122 and the inner joint member 123 are not offset in the axial direction with respect to the joint center O. However, the track grooves 127 and 129 thus inclined and opposed cross each other, and the balls 124 are interposed in those crossing portions. Therefore, when the joint forms an operating angle, the balls 124 are always guided in a plane bisecting an angle formed between axial lines of the outer joint member 122 and the inner joint member 123. As a result, rotational torque is transmitted at a constant velocity between the two axes.

In the above-mentioned fixed type constant velocity universal joint 121 of the track groove crossing type, the track grooves 127 of the outer joint member 122 that are adjacent to each other in the peripheral direction are inclined in the opposite directions. Further, the track grooves 129 of the inner joint member 123 that are adjacent to each other in the peripheral direction are inclined in the opposite directions. Therefore, forces in the opposite directions are applied from the balls 124 to pocket portions 125a of the cage 125 that are adjacent to each other in the peripheral direction. Due to the forces in the opposite directions, the cage 125 is stabilized at the position of the joint center O. Thus, a contact force between the spherical outer peripheral surface 132 of the cage 125 and the spherical inner peripheral surface 126 of the outer joint member 122, and a contact force between the spherical inner peripheral surface 133 of the cage 125 and the spherical outer peripheral surface 128 of the inner joint member 123 are suppressed. Accordingly, the joint is smoothly operated under high load and in high speed rotation. As a result, torque loss and heat generation are suppressed, and the durability is enhanced.

The above-mentioned fixed type constant velocity universal joint 121 is excellent as a joint that is suppressed in heat generation, but has the following problem. Detailed description thereof is given with reference to FIG. 27. FIG. 27a illustrates a state in which the above-mentioned constant velocity universal joint forms a high operating angle, and FIG. 27b illustrates a positional relationship between the track groove 127 of the outer joint member 122 and the ball 124 on an enlarged scale. When the joint forms a high operating angle $\theta$ as illustrated in FIG. 27a, a center Ob of the ball 124 is moved to a position of $\theta/2$ with respect to the plane P including the joint center O at the operating angle of 0°. The ball 124 and the track groove 127 are held in angular contact with each other at a contact angle, and hence a contact point between the ball 124 and the track groove 127 is positioned on the broken line of FIG. 27b. In the axial direction, the contact point between the ball 124 and the track groove 127 is positioned in a plane t that passes through the center Ob of the ball 124 and is orthogonal to the ball raceway center line x. In the above-mentioned fixed type constant velocity universal joint 121, when a large inlet chamfer 130 is formed in the outer joint member 122, the ball 124 is positioned on an outer side of the inlet chamfer 130 at the high operating angle $\theta$, and drops off the track groove 127. This is because the effective track length is insufficient. More specifically, the curvature center of the arc-shaped track groove 127 and the joint center O match with each other, and hence a distance W in the axial direction between the center Ob of the ball 124 and a contact point s is large. Therefore, there is a problem in that high operating angles cannot be formed.

PRIOR ART DOCUMENTS

Patent Documents

Patent Document 1: JP 2009-250365 A

SUMMERY OF THE INVENTION

Problems to be Solved by the Invention

In view of the above-mentioned problem with the related art, the inventors of the present invention have investigated the possibility of forming the track grooves on the opening side with respect to the joint center O into a straight shape so as to form higher operating angles in the fixed type constant velocity universal joint of the track groove crossing type disclosed in Patent Literature 1. FIG. 23 illustrate this constant velocity universal joint. FIG. 23a illustrates a vertical cross section, and FIG. 23b illustrates a right side of FIG. 23a. As illustrated in FIG. 23a, a constant velocity universal joint 141 includes an outer joint member 142 and an inner joint member 143 respectively having track grooves 147 and 149 of a crossing type. The track grooves 147 of the outer joint member 142 each include a track groove portion 147a provided on an interior side with respect to the joint center O and having an arc-shaped ball raceway center line xa that has a curvature center at the joint center O, and a track groove portion 147b provided on the opening side with respect to the joint center O and having a straight ball raceway center line xb. On the other hand, the track grooves 149 of the inner joint member 143 each include a track groove portion 149b provided on the interior side with respect to the joint center O and having a straight ball raceway center line yb, and a track groove portion 149a provided on the opening side with respect to the joint center O and having an arc-shaped ball raceway center line ya that has a curvature center at the joint center O.

In addition, as illustrated in FIG. 23b, the track grooves 147 include track grooves 147A and 147B that are inclined in a peripheral direction with respect to a joint axial line and adjacent to each other in the peripheral direction with their inclination directions opposite to each other. Further, the track grooves 149 include track grooves 149A and 149B that are inclined in the peripheral direction with respect to the joint axial line and adjacent to each other in the peripheral direction with their inclination directions opposite to each other. In addition, balls 144 are arranged in crossing portions of the paired track grooves 147A and 149A and the paired track grooves 147B and 149B of the outer joint member 142 and the inner joint member 143. Thus, when torque is transmitted at the operating angle of 0° as illustrated in FIGS. 23a and 23b, an opening direction of a wedge angle formed between the track grooves 147A and 149A and an opening direction of a wedge angle formed between the track grooves 147B and 149B become opposite to each other, and hence forces in the opposite directions are applied from the balls 144 to pocket portions 145a of a cage 145 that are adjacent to each other in the peripheral direction. Due to the forces in the opposite directions, the cage 145 is stabilized at the position of the joint center O. Thus, a contact force between a spherical outer peripheral surface 152 of the cage 145 and a spherical inner peripheral surface 146 of the outer joint member 142, and a contact force between a spherical inner peripheral surface 153 of the cage 145 and a spherical outer peripheral surface 148 of the inner joint member 143 are suppressed. Accordingly, the joint is smoothly operated under high load and in high speed rotation. As a result, torque loss and heat generation are suppressed, and the durability is enhanced.

As described above, in the track groove crossing type, when the straight track groove portion 147b of each of the track grooves 147 of the outer joint member 142 is formed on the opening side with respect to the joint center O, the effective track length can be increased. However, it has been found that, when a frequently used operating angle is formed, there arise problems in terms of suppression of the torque loss and heat generation of the joint. The reason is described with reference to FIG. 24. The track grooves 147 and 149 are generally held in contact with each ball 144 at a contact angle (approximately from 30° to 45°), and hence, as illustrated in FIG. 24, the track grooves 147 and 149 are held in contact with the ball 144 at positions indicated by the broken lines on side surface sides of the track grooves 147 and 149, which are slightly spaced apart from groove bottoms of the track grooves 147 and 149. When the joint forms an operating angle, wedge angle components (not shown) due to the crossing between the track grooves 147 and 149 and wedge angle components α due to expansion between the groove bottoms of the track grooves 147 and 149 in a radial direction of the joint are both applied to the balls 144. Of those wedge angle components, the wedge angle components due to the crossing between the track grooves 147 and 149 are canceled and forces are balanced because the track grooves 147 and 149 are inclined in the directions opposite to each other and hence forces in the opposite directions are applied from the balls 144 to the pocket portions 145a of the cage 145.

However, as illustrated in FIG. 24, in the case of the wedge angle components α due to the expansion between the groove bottoms of the track grooves 147 and 149 in the radial direction of the joint, the balls 144 within phase ranges of from 0° to 90° and from 270° to 360° in FIG. 23b are positioned between the straight track groove portions 147b and 149b. Due to a wedge angle component α1 opened toward the opening side, a force toward the opening side is applied to the balls 144 within those phase ranges. On the other hand, the balls 144 within a phase range of from 90° to 270° are positioned between the arc-shaped track groove portions 147a and 149a. Therefore, a wedge angle component α2, which is generated due to the expansion in the radial direction of the joint, is zero in the balls within this phase range, and hence no push-out force is generated in the balls 144. Thus, when the wedge angle components due to the crossing between the track grooves 147 and 149 and the wedge angle components α due to the expansion between the groove bottoms of the track grooves 147 and 149 in the radial direction of the joint are applied to the balls 144 in combination, the forces applied from the balls 144 to the pocket portions 145a of the cage 145 are not balanced with each other. As a result, there arises a problem in that the contact force between the spherical contact portion 152 of the cage 145 and the spherical contact portion 146 of the outer joint member 142, and the contact force between the spherical contact portion 153 of the cage 145 and the spherical contact portion 148 of the inner joint member 143 cannot be suppressed. In particular, it has been found that this problem is serious in terms of suppression of the torque loss and heat generation in a range of the frequently used operating angles including a normal operating angle.

Further, in the constant velocity universal joint 141 illustrated in FIGS. 23 and 24, the straight track groove portion 147b is formed parallel to a joint axial line that corresponds to projection of the joint axial line n-n onto a plane including the ball raceway center line x and the joint center O. On the other hand, the straight track groove portion 149b is formed parallel to the joint axial line that corresponds to projection of the joint axial line n-n onto a plane including the ball raceway center line y and the joint center O. Thus, when the joint forms a high operating angle, a high wedge angle is formed between the straight track groove portions 147b and 149b. As a result, a force of causing the ball 144 sandwiched between the straight track groove portions 147b and 149b to jump out to the opening side becomes greater. It has been found that the greater jumping-out force increases loads on the pockets of the cage 145, which causes a problem with a strength of the cage 145 at high operating angles.

In view of the above-mentioned problems, the present invention has an object to provide a compact fixed type constant velocity universal joint that is suppressed in torque loss and heat generation, enhanced in efficiency, capable of forming high operating angles, and is excellent in strength and durability at the high operating angles.

Solution to Problems

As a result of various investigations for achieving the above-mentioned object, the inventors of the present invention have arrived at the following novel idea. In order to suppress torque loss and heat generation and to achieve higher efficiency, track grooves are formed so as to cross each other in a peripheral direction. A first track groove portion having an arc-shaped ball raceway line that has a curvature center prevented from being offset in the axial direction with respect to a joint center is provided so as to be adaptable to a range of frequently used operating angles, and an arc-shaped second track groove portion that is curved in an opposite direction to that of the first track groove portion so as to increase an effective track length with respect to a maximum operating angle is provided so as to be adaptable to a range of less frequently used high operating angles. In addition, the inventors of the present invention have found a novel standard for suppressing a degree of a wedge angle between the second track groove portions at high operating angles.

As a technical measure to achieve the above-mentioned object, according to one embodiment of the present invention, there is provided a fixed type constant velocity universal joint, comprising: an outer joint member having a spherical inner peripheral surface in which a plurality of track grooves are formed so as to extend in an axial direction of the outer joint member, the outer joint member having an opening side and an interior side spaced apart from each other in the axial direction; an inner joint member having a spherical outer peripheral surface in which a plurality of track grooves are formed so as to be paired with the plurality of track grooves of the outer joint member; a plurality of balls for transmitting torque, the plurality of balls being interposed between the plurality of track grooves of the outer joint member and the plurality of track grooves of the inner joint member; and a cage comprising pockets for holding the plurality of balls, the cage having a spherical outer peripheral surface, which is fitted to the spherical inner peripheral surface of the outer joint member, and a spherical inner peripheral surface, which is fitted to the spherical outer peripheral surface of the inner joint member, wherein the plurality of track grooves of the outer joint member comprise: first track groove portions 7a positioned on the interior side; and second track groove portions 7b positioned on the opening side, wherein the first track groove portions 7a each have an arc-shaped ball raceway center line Xa having a curvature center that is prevented from being offset in the axial direction with respect to a joint center O, wherein planes M each comprising at least the arc-shaped ball raceway center line Xa and the joint center O are inclined with respect to a joint axial line N-N with their inclination directions alternately opposite to each other in the first track groove portions 7a that are adjacent to each other in a peripheral direction of the outer joint member, wherein the second track groove portions 7b each have an arc-shaped ball raceway center line Xb having a curvature center that is offset to a radially outer side with respect to the arc-shaped ball raceway center line Xa of corresponding one of the first track groove portions 7a, wherein an end portion A of the arc-shaped ball raceway center line Xa of each of the first track groove portions 7a is positioned on the opening side with respect to the joint center O, wherein a position of the end portion A occupies at least 60% of an effective track length on the opening side with respect to the joint center O, wherein the arc-shaped ball raceway center line Xb of each of the second track groove portions 7b is connected to the end portion A, and wherein a ball raceway center line Y of each of the plurality of track grooves of the inner joint member is formed so as to be mirror-image symmetrical with a ball raceway center line X of corresponding one of the plurality of paired track grooves of the outer joint member with respect to a plane P comprising the joint center O at an operating angle of 0°. The above-mentioned "joint axial line" herein refers to a longitudinal axial line that is a joint rotation center, and corresponds to a joint axial line N-N in the embodiments described later. The same applies to a joint axial line described in the claims.

With the above-mentioned configuration, it is possible to attain a compact fixed type constant velocity universal joint that is suppressed in torque loss and heat generation, enhanced in efficiency, capable of forming high operating angles, and is excellent in strength and durability at the high operating angles. In particular, the end portion A of the arc-shaped ball raceway center line Xa of the each of the first track groove portions 7a is positioned on the opening side with respect to the joint center O, the position of the end portion A occupies at least 60% of the effective track length on the opening side with respect to the joint center O, and the arc-shaped ball raceway center line Xb of each of the second track groove portions 7b is connected to the end portion A. Thus, a degree of a wedge angle between each of the second track groove portions 7b and corresponding one of the second track groove portions 9b at high operating angles can be suppressed. As a result, a strength of the cage can be secured.

Specifically, an angle formed by a straight line L connecting the joint center O and the end portion A on the opening side of the arc-shaped ball raceway center line Xa of the each of the above-mentioned first track groove portions 7a with respect to the plane P comprising the joint center O at the operating angle of 0° is represented by β, and it is preferred that the angle β be set to 14° to 16°. With this, the degree of the wedge angle between the each of the second track groove portions 7b and corresponding one of the second track groove portions 9b at the high operating angles can be suppressed. As a result, the strength of the cage can be secured. In order to adapt to a range of frequently used operating angles including a normal angle in constant velocity universal joints to be used for an automotive drive shaft, it is only necessary that the angle β be set to approximately 10°. However, the range of the angle β of from 14° to 16° has been found as a novel standard for suppressing the degree of the wedge angle between the each of the second track groove portions 7b and the corresponding one of the second track groove portions 9b. Note that, the angle β is herein defined as the smallest angle among the angles formed by the straight line L with respect to the straight line on the plane P, and the same applies to the embodiments and the claims.

More specifically, in order to suppress the wedge angle between the each of the second track groove portions 7b and the corresponding one of the second track groove portions 9b at the high operating angles, it is preferred that the angle β be as high as possible. However, when the angle β is excessively high, the effective track length decreases. In other words, an advantage obtained by providing the second track groove portions 7b and the second track groove portions 9b becomes insignificant, and hence the high operating angles cannot be formed. A required maximum operating angle of the fixed type constant velocity universal joints normally ranges from 46° to 50°, and it has been found that, in order to secure an effective track length that is required to form the operating angle of from 46° to 50°, the angle β is required to fall within the range of from 14° to 16° even when the effective track length that varies depending on a balance of a ball diameter and a PCD diameter is taken into consideration. Thus, in order to suppress the degree of the wedge angle between the each of the second track groove portions 7b and the corresponding one of the second track groove portions 9b at the high operating angles, secure the strength of the cage, and to secure required operating angles, a maximum value of the angle β is required to fall within the range of from 14° to 16°. In this case, it is essential to set the end portion A of the arc-shaped ball raceway center line Xa of the each of the first track groove portion 7a to a position of 60% of the effective track length on the opening side with respect to the joint center O.

Further, it is preferred that a wedge angle 2τ' in two-dimensional cross section at a phase angle φ of 0° be set based on an actual wedge angle 2τ of 43° or less of each of the plurality of track grooves of the outer joint member and the plurality of track grooves of the inner joint member at a maximum operating angle of the fixed type constant velocity universal joint and based on the following equation:

$$(2\tau) = (2\tau')\cos \delta + (2\gamma)\sin \delta$$

where δ is contact angles between one of the plurality of balls and corresponding one of the plurality of track grooves of the outer joint member and between the one of the plurality of balls and corresponding one of the plurality of track grooves of the inner joint member, and γ is an inclination angle of the corresponding one of the plurality of track grooves of the outer joint member and the corresponding one of the plurality of track grooves of the inner joint member. With this, parameters of the plurality of track grooves of the outer joint member and the plurality of track grooves of the inner joint member can be determined based on the wedge angle 2τ' in two-dimensional cross section at the phase angle φ of 0°. Thus, work of setting the parameters of the plurality of track grooves of the outer joint member and the plurality of track grooves of the inner joint member can be markedly simplified. Further, such setting of the parameters enables strength and durability at the maximum operating angle to be secured equivalently to those of widely available related-art constant velocity universal joints.

Further, it is preferred that, at the maximum operating angle of the fixed type constant velocity universal joint, an allowance amount a be secured between the spherical outer peripheral surface of the cage and a contact point between the one of the plurality of balls and corresponding one of the pockets of the cage, the one of the plurality of balls being moved to an end of the radially outer side with respect to the corresponding one of the pockets. With this, a thickness of the cage can be increased in a radial direction, and stress concentration on edge portions of rims of the pockets can be alleviated. As a result, a higher strength of the cage can be secured.

The curvature center of the arc-shaped ball raceway center line Xa of the each of the above-mentioned first track groove portions 7a is arranged on the joint axial line N-N. With this, track groove depths can be equalized. Further, the curvature center of the arc-shaped ball raceway center line Xa of the each of the first track groove portions 7a is offset in the radial direction with respect to the joint axial line N-N. With this, the track groove depths can be adjusted on the interior side of the joint, and hence an optimum track groove depth can be secured.

The spherical outer peripheral surface of the cage and the spherical inner peripheral surface of the cage each have a curvature center that is offset in the axial direction with respect to the joint center O. With this, the thickness of the cage can be increased toward the opening side. As a result, a higher strength of the cage at the high operating angles can be secured.

The curvature center of the arc-shaped ball raceway center line Xb of the each of the above-mentioned second track groove portions 7b is formed at a position out of corresponding one of the planes M, the corresponding one of the planes M comprising the arc-shaped ball raceway center line Xa of the corresponding one of the first track groove portions 7a and the joint center O. In addition, an inclination angle γ of the arc-shaped ball raceway center line Xb of the each of the second track groove portions 7b may be gradually lowered toward the opening side. With this, the intervals on the approaching side are increased between the second track groove portions 7b that are adjacent to each other in the peripheral direction, and the intervals on the separating side are reduced therebetween. Thus, differences between the intervals can be reduced in the peripheral direction. As a result, a difference in contact area on the opening side between the respective regions of the spherical inner peripheral surface of the outer joint member, and a difference in contact area on the interior side between the respective regions of the spherical outer peripheral surface of the inner joint member can be reduced. Thus, spherical contact portions between the cage and the outer joint member, and between the cage and the inner joint member can be arranged in a balanced manner. As a result, further smoother operability can be achieved.

The number of the plurality of balls for transmitting torque is set to eight. With this, it is possible to attain a fixed type constant velocity universal joint and therefore an automotive drive shaft that are lightweight and compact, enhanced in efficiency, and are capable of forming high operating angles.

Advantageous Effects of Invention

According to one embodiment of the present invention, it is possible to attain a compact fixed type constant velocity universal joint that is suppressed in torque loss and heat generation, enhanced in efficiency, capable of forming high operating angles, and is excellent in strength and durability at the high operating angles. In particular, the degrees of the wedge angles between the plurality of track grooves of the outer joint member and the plurality of track grooves of the inner joint member at the high operating angles can be suppressed. As a result, the strength of the cage can be secured.

BRIEF DESCRIPTION OF DRAWINGS

FIG. 1a is a partial vertical sectional view of a fixed type constant velocity universal joint according to a first embodiment of the present invention.

FIG. 1b is a side view of the fixed type constant velocity universal joint.

FIG. 3a is a left-hand side view of an inner joint member of the fixed type constant velocity universal joint.

FIG. 3b is a view of an outer peripheral surface of the inner joint member.

FIG. 3c is a right-hand side view of the inner joint member.

FIG. 7a is a view of a contact state between a ball and the track grooves at the maximum operating angle of the joint.

FIG. 7b is a partially enlarged view of FIG. 7a.

DESCRIPTION OF EMBODIMENTS

Figure 2B:
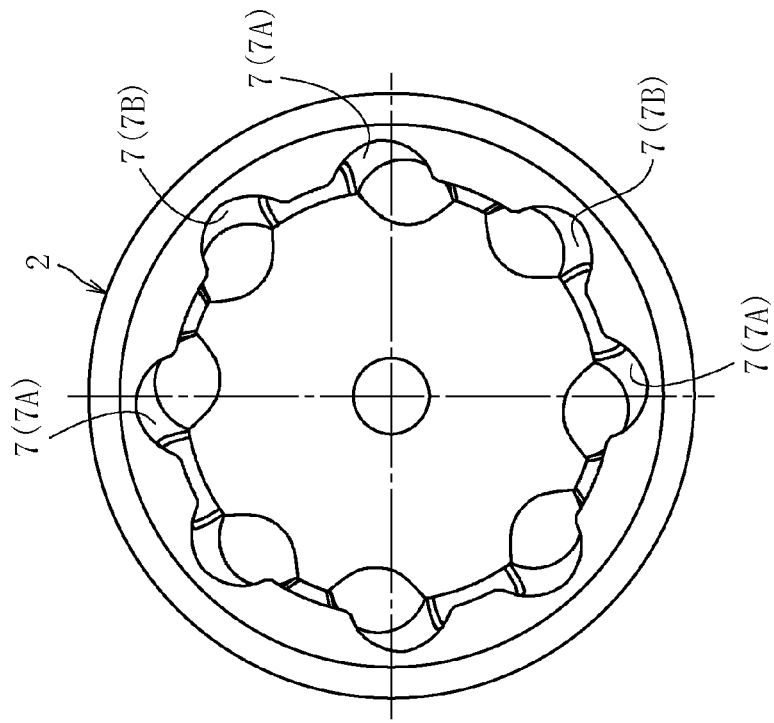
FIG. 2b is a side view of the outer joint member.

Embodiments of the present invention are described with reference to FIGS. 1 to 22.

FIGS. 1 to 13 illustrate a first embodiment of the present invention. FIG. 1 illustrate a fixed type constant velocity universal joint according to the first embodiment. FIG. 1(a) is a partial vertical sectional view, and FIG. 1(b) is a right-hand side view of FIG. 1(a). A constant velocity universal joint 1 mainly comprises an outer joint member 2, an inner joint member 3, balls 4, and a cage 5. As illustrated in FIGS. 1(b), 2, and 3, eight track grooves 7 of the outer joint member 2 comprise track grooves 7A and 7B, and eight track grooves 9 of the inner joint member 3 comprise track grooves 9A and 9B. The track grooves 7A and 7B and the track grooves 9A and 9B are inclined in a peripheral direction with respect to a joint axial line N-N and adjacent to each other in the peripheral direction with their inclination directions alternately opposite to each other. In addition, eight balls 4 are arranged in crossing portions between the paired track grooves 7A and 9A and the paired track grooves 7B and 9B of the outer joint member 2 and the inner joint member 3. FIG. 1(a) illustrates the track grooves 7 and 9 under a state in which cross sections taken along a plane M illustrated in FIG. 2(a) and a plane Q illustrated in FIG. 3(b) are turned to an inclination angle γ of 0°. Detailed description thereof is given later.

In order to precisely describe forms such as an inclined state and a curved state, and a shape of the track grooves extending in an axial direction, the term "ball raceway center line" is used in this specification. Here, the ball raceway center line refers to a trajectory of a center of the ball that is arranged in the track groove at the time of moving along the track groove. Thus, the inclined state of the track groove corresponds to an inclined state of the ball raceway center line, and a state of an arc shape of the track groove corresponds to a state of an arc shape of the ball raceway center line.

As illustrated in FIG. 1(a), the track groove 7 of the outer joint member 2 has a ball raceway center line X, and comprises a first track groove portion 7a having an arc-shaped ball raceway center line Xa that has a curvature center at a joint center O, and a second track groove portion 7b having an arc-shaped ball raceway center line Xb that is curved in an opposite direction to that of the first track groove portion 7a. The ball raceway center line Xb of the second track groove portion 7b is connected smoothly to the ball raceway center line Xa of the first track groove portion 7a. On the other hand, the track groove 9 of the inner joint member 3 has a ball raceway center line Y, and comprises a first track groove portion 9a having an arc-shaped ball raceway center line Ya that has a curvature center at the joint center O, and a second track groove portion 9b having an arc-shaped ball raceway center line Yb that is curved in an opposite direction to that of the first track groove portion 9a. The ball raceway center line Yb of the second track groove portion 9b is connected smoothly to the ball raceway center line Ya of the first track groove portion 9a.

The curvature center of each of the ball raceway center line Xa and Ya of the first track groove portions 7a and 9a is arranged at the joint center O, that is, on the joint axial line N-N. With this, depths of the track groove can be equalized, and the track grooves can be easily processed.

Figure 2A:
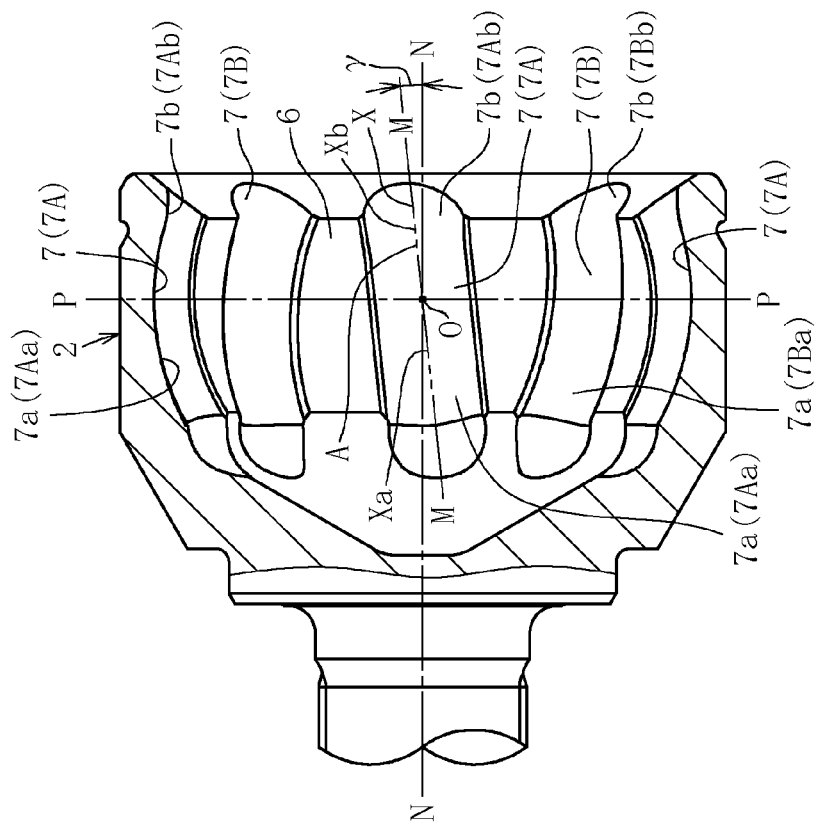
FIG. 2a is a partial vertical sectional view of an outer joint member of the fixed type constant velocity universal joint.

Referring to FIG. 2, description is given of a state in which the track grooves 7 of the outer joint member 2 are inclined in the peripheral direction with respect to the joint axial line N-N. FIG. 2(a) illustrates a partial vertical cross section of the outer joint member 2, and FIG. 2(b) illustrates a right side of the outer joint member 2. The track grooves 7 of the outer joint member 2 are represented by the reference symbols 7A and 7B to indicate a difference in inclination direction thereof. As illustrated in FIG. 2(a), the plane M comprising the ball raceway center line X of each track groove 7A and the joint center O is inclined at an angle γ with respect to the joint axial line N-N. In addition, although illustration is omitted in the case of each track groove 7B adjacent to the track groove 7A in the peripheral direction, the plane M comprising the ball raceway center line X of the track groove 7B and the joint center O is inclined at an angle γ with respect to the joint axial line N-N in an opposite direction to the inclination direction of the track groove 7A. In this embodiment, the entire ball raceway center line X of the track groove 7A, that is, both the ball raceway center line Xa of the first track groove portion 7a and the ball raceway center line Xb of the second track groove portion 7b are formed in the plane M. However, the present invention is not limited thereto, and there may be employed such an embodiment that only the ball raceway center line Xa of the first track groove portion 7a is included in the plane M. Thus, it is only necessary that the planes M comprising at least the ball raceway center line Xa of the first track groove portion 7a and the joint center O be inclined with respect to the joint axial line N-N with their inclination directions alternately opposite to each other in the first track groove portions 7a adjacent to each other in the peripheral direction.

Now, supplementary description is given of the reference symbols of the track grooves. Reference symbol 7 represents the track grooves of the outer joint member 2 as a whole, reference symbol 7a represents the first track groove portion, and reference symbol 7b represents the second track groove portion. Further, reference symbols 7A and 7B represent the track grooves distinguished from each other based on the difference in inclination direction, reference symbols 7Aa and 7Ba represent first track groove portions of the respective track grooves 7A and 7B, and reference symbols 7Ab and 7Bb represent second track groove portions of the respective track grooves 7A and 7B. The track grooves of the inner joint member 3 described later are represented by the reference symbols in a similar manner.

Next, referring to FIG. 3, description is given of a state in which the track grooves 9 of the inner joint member 3 are inclined in the peripheral direction with respect to the joint axial line N-N. FIG. 3(b) illustrates an outer peripheral surface of the inner joint member 3, FIG. 3(a) illustrates a left side of the inner joint member 3, and FIG. 3(c) illustrates a right side of the inner joint member 3. The track grooves 9 of the inner joint member 3 are represented by the reference symbols 9A and 9B to indicate a difference in inclination direction thereof. As illustrated in FIG. 3(b), the plane Q comprising the ball raceway center line Y of each track groove 9A and the joint center O is inclined at an angle $\gamma$ with respect to the joint axial line N-N. In addition, although illustration is omitted, in the case of each track groove 9B adjacent to the track groove 9A in the peripheral direction, the plane Q comprising the ball raceway center line Y of the track groove 9B and the joint center O is inclined at an angle $\gamma$ with respect to the joint axial line N-N in an opposite direction to the inclination direction of the track groove 9A. The inclination angle $\gamma$ is in a range of preferably 4° to 12°, more preferably 4° to 8° in consideration of operability of the constant velocity universal joint 1 and a spherical width F between the closest sides of the track grooves of the inner joint member 3.

Similarly to the outer joint member described above, the entire ball raceway center line Y of the track groove 9A, that is, both the ball raceway center line Ya of the first track groove portion 9a and the ball raceway center line Yb of the second track groove portion 9b are formed in the plane Q. However, the present invention is not limited thereto, and may be carried out in such an embodiment that only the ball raceway center line Ya of the first track groove portion 9a is included in the plane Q. Thus, it is only necessary that the planes Q comprising at least the ball raceway center line Ya of the first track groove portion 9a and the joint center O be inclined in the peripheral direction with respect to the joint axial line N-N with their inclination directions alternately opposite to each other in the first track groove portions 9a adjacent to each other in the peripheral direction. The ball raceway center line Y of the track groove 9 of the inner joint member 3 is formed so as to be mirror-image symmetrical with the ball raceway center line X of the paired track groove 7 of the outer joint member 2 with respect to a plane P comprising a joint center O at an operating angle of 0°.

Figure 4:
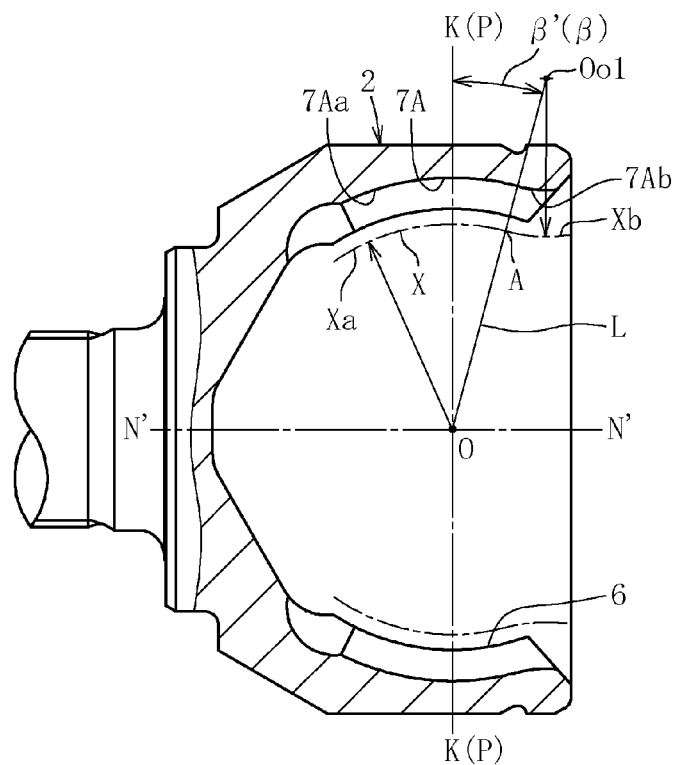
FIG. 4 is a partial vertical sectional view of details of track grooves of the outer joint member.

Referring to FIG. 4, detailed description is given of the track grooves in the view take along the vertical cross section of the outer joint member 2. The partial vertical cross section of FIG. 4 corresponds to a sectional view taken along the above-mentioned plane M of FIG. 2(a) including the ball raceway center line X of the track groove 7A and the joint center O. Thus, in a strict sense, FIG. 4 is not a vertical sectional view in the plane comprising the joint axial line N-N, but is a view illustrating a cross section inclined at the angle $\gamma$. FIG. 4 illustrates the track groove 7A of the outer joint member 2, and the illustration and description of the track groove 7B are omitted because the inclination direction of the track groove 7B is opposite to that of the track groove 7A and other structural details of the track groove 7B are the same as those of the track groove 7A.

As illustrated in FIG. 4, in a spherical inner peripheral surface 6 of the outer joint member 2, the track grooves 7A are formed along the axial direction. The track groove 7A has the ball raceway center line X, and comprises a first track groove portion 7Aa having the arc-shaped ball raceway center line Xa that has a curvature center at the joint center O (not offset in the axial direction), and a second track groove portion 7Ab having the arc-shaped ball raceway center line Xb that is curved in an opposite direction to that of the first track groove portion 7Aa. A curvature center Oo1 of the ball raceway center line Xb of the second track groove portion 7Ab is offset to a radially outer side with respect to the ball raceway center line Xa of the first track groove portion 7Aa and is offset further to the opening side with respect to the joint center O, and a curvature radius of the ball raceway center line Xb of the second track groove portion 7Ab is formed so as to be smaller than a curvature radius of the ball raceway center line Xa of the first track groove portion 7Aa. Further, the ball raceway center line Xb of the second track groove portion 7Ab is connected smoothly to an end portion A on an opening side of the ball raceway center line Xa of the first track groove portion 7Aa. In other words, the end portion A serves as a connecting point between the first track groove portion 7Aa and the second track groove 7Ab. The end portion A is positioned on the opening side with respect to the joint center O, and this position is set so as to occupy 61% of an effective track length on the opening side with respect to the joint center O. The arc-shaped ball raceway center line Xb of the second track groove portion 7b having the smaller curvature radius is connected to the end portion A. Thus, at a maximum operating angle, the effective track length can be secured, and a wedge angle can be suppressed from becoming excessively higher.

As illustrated in FIG. 4, the end portion A and the joint center O are connected to each other by a straight line L. A joint axial line N'-N' projected onto the plane M (see FIG. 2(a)) including the ball raceway center line X of the track groove 7A and the joint center O is inclined at $\gamma$ with respect to the joint axial line N-N. An angle @' is formed between a perpendicular line K with respect to the joint center O on the joint axial line N'-N' and the straight line L. The above-mentioned perpendicular line K is formed in the plane P comprising the joint center O at the operating angle of 0°. Thus, an angle $\beta$ formed by the straight line L with respect to the plane P comprising the joint center O at the operating angle of 0° satisfies a relationship of $\sin \beta = \sin \beta' \times \cos \gamma$ in the present invention. In this embodiment, the angle $\beta$ is set to 15°, and the position of the end portion A occupies 61% of the effective track length on the opening side with respect to the joint center O. Detailed description of the effective track length is given later.

Figure 5:
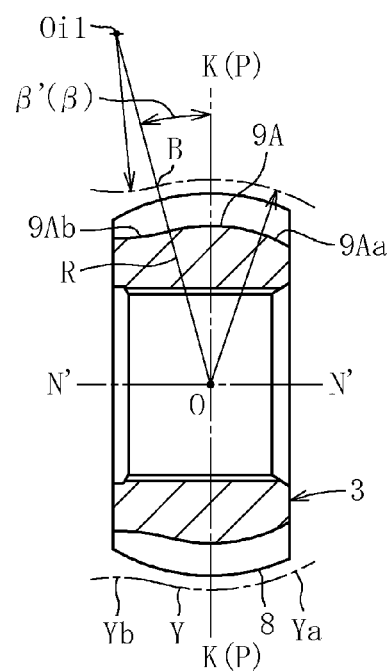
FIG. 5 is a vertical sectional view of details of track grooves of the inner joint member.

Similarly, referring to FIG. 5, detailed description is given of the track grooves in the vertical cross section of the inner joint member 3. The vertical cross section of FIG. 5 corresponds to a sectional view taken along the above-mentioned plane Q of FIG. 3(b) comprising the ball raceway center line Y of the track groove 9A and the joint center O. Thus, similarly to FIG. 4, in a strict sense, FIG. 5 is not a vertical sectional view in the plane comprising the joint axial line N-N, but is a view illustrating a cross section inclined at the angle γ. FIG. 5 illustrates the track groove 9A of the inner joint member 3, and the illustration and description of the track groove 9B are omitted because the inclination direction of the track groove 9B is opposite to that of the track groove 9A and other structural details of the track groove 9B are the same as those of the track groove 9A.

In a spherical outer peripheral surface 8 of the inner joint member 3, the track grooves 9A are formed along the axial direction. The track groove 9A has the ball raceway center line Y, and comprises a first track groove portion 9Aa having the arc-shaped ball raceway center line Ya that has a curvature center at the joint center O (not offset in the axial direction), and a second track groove portion 9Ab having the arc-shaped ball raceway center line Yb that is curved in an opposite direction to that of the first track groove portion 9Aa. A curvature center Oi1 of the ball raceway center line Yb of the second track groove portion 9Ab is offset to a radially outer side with respect to the ball raceway center line Ya of the first track groove portion 9Aa, and a curvature radius of the ball raceway center line Yb of the second track groove portion 9Ab is formed so as to be smaller than a curvature radius of the ball raceway center line Ya of the first track groove portion 9Aa. Further, the ball raceway center line Yb of the second track groove portion 9Ab is connected smoothly to an end portion B on an interior side of the ball raceway center line Ya of the first track groove portion 9Aa. In other words, the end portion B serves as a connecting point between the first track groove portion 9Aa and the second track groove 9Ab.

As illustrated in FIG. 5, the end portion B and the joint center O are connected to each other by a straight line R. A joint axial line N'-N' projected onto the plane Q (see FIG. 3(b)) comprising the ball raceway center line Y of the track groove 9A and the joint center O is inclined at γ with respect to the joint axial line N-N. An angle @' is formed between a perpendicular line K with respect to the joint center O on the joint axial line N'-N' and the straight line R. The above-mentioned perpendicular line K is formed in the plane P comprising the joint center O at the operating angle of 0°. Thus, an angle β formed by the straight line R with respect to the plane P comprising the joint center O at the operating angle of 0° satisfies a relationship of sin β=sin β×cos γ. The angle β is set to 15° similarly to the outer joint member.

Referring to FIG. 4, due to the above-mentioned angle β, the end portion A of the ball raceway center line Xa of the first track groove portion 7Aa is positioned further on the opening side with respect to a center position of the ball that is moved to the end of the opening side along the axial direction at a frequently used operating angle. Similarly, referring to FIG. 5, with regard to the inner joint member 3, the end portion B of the ball raceway center line Ya of the first track groove portion 9Aa is positioned further on the interior side with respect to the center position of the ball that is moved to the end of the interior side along the axial direction at the frequently used operating angle. In a range of frequently used operating angles, the balls 4 are positioned between the first track groove portions 7Aa and 9Aa of the outer joint member 2 and the inner joint member 3 and between first track groove portions 7Ba and 9Ba that are inclined in the opposite directions (see FIGS. 2 and 3). Thus, forces in opposite directions are applied from the balls 4 to pocket portions 5a of the cage 5, which are adjacent to each other in the peripheral direction, and hence the cage 5 is stabilized at the position of the joint center O (see FIG. 1). Thus, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Accordingly, the joint is smoothly operated under high load and in high speed rotation, and hence torque loss and heat generation are suppressed. As a result, higher durability is achieved.

In the constant velocity universal joint according to this embodiment, the balls 4 may be fitted into the pocket portions 5a of the cage 5 with a clearance. In this case, it is preferred that the clearance be set to approximately 0 μm to 40 μm. When the balls 4 are fitted into the pocket portions 5a with the clearance, the balls 4 held in the pocket portions 5a of the cage 5 can be smoothly operated, and hence the torque loss can be further suppressed.

Figure 6:
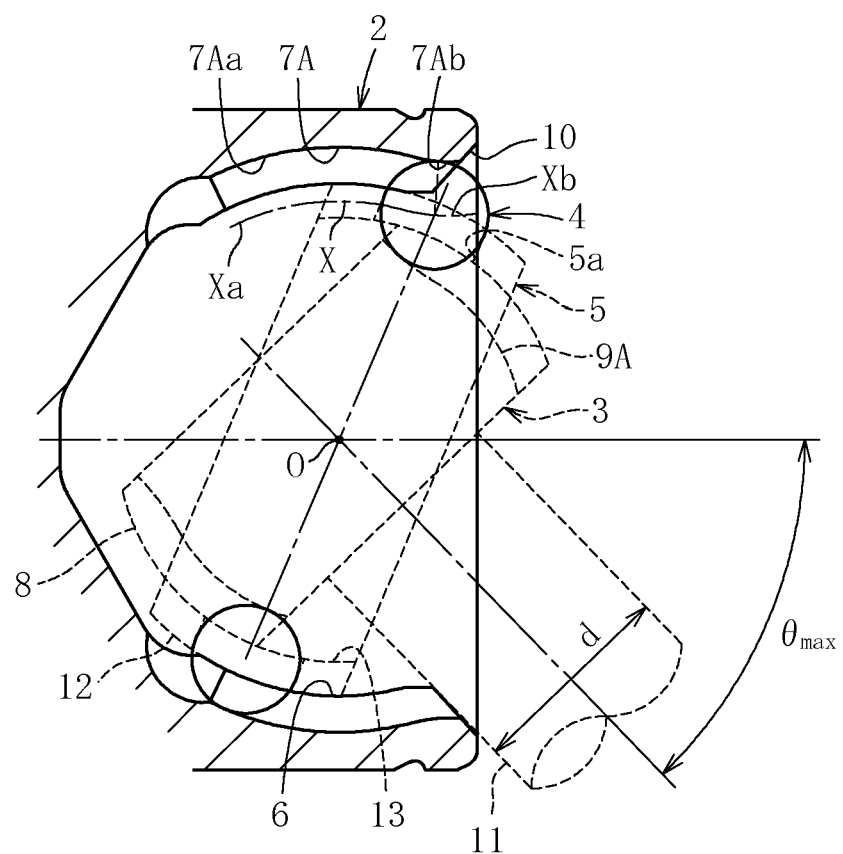
FIG. 6 is a schematic view of a state in which the joint forms a maximum operating angle.

FIG. 6 illustrates a state in which the constant velocity universal joint according to this embodiment forms a maximum operating angle. FIG. 6 and FIGS. 7 to 11 below illustrate the track grooves 7A and 9A under a state in which the cross sections taken along the plane M illustrated in FIG. 2(a) and the plane Q illustrated in FIG. 3(b) are turned to the inclination angle γ of 0°. In this embodiment, at the maximum operating angle, the effective track length can be secured, and the wedge angle can be suppressed from becoming excessively higher. Thus, as in FIG. 6, even when a maximum operating angle $\theta_{max}$ is formed so as to be as high as approximately 47°, a contact state between the ball 4 and the track groove 7Ab can be secured under a state in which an inlet chamfer 10 having a necessary and sufficient size is provided, and the wedge angle can be suppressed from becoming higher.

Note that, in a range of high operating angles, the balls 4 arranged in the peripheral direction are temporarily separately positioned between the first track groove portions 7Aa and 9Aa (7Ba and 9Ba, see FIGS. 2(a) and 3(b)) and between the second track groove portions 7Ab and 9Ab (7Bb and 9Bb; see FIGS. 2(a) and 3(b)). Thus, the forces applied from the balls 4 to the pocket portions 5a of the cage 5 are not balanced with each other, and hence the contact forces are generated between the spherical contact portion 12 of the cage 5 and the spherical contact portion 6 of the outer joint member 2, and between the spherical contact portion 13 of the cage 5 and the spherical contact portion 8 of the inner joint member 3. However, the angles in the range of high operating angles are used less frequently, and hence the constant velocity universal joint 1 according to this embodiment is comprehensively capable of suppressing torque loss and heat generation. Thus, it is possible to attain a compact fixed type constant velocity universal joint that is suppressed in torque loss and heat generation, enhanced in efficiency, capable of forming high operating angles, and is excellent in strength and durability at the high operating angles.

Description is hereinabove given of an overall configuration of the fixed type constant velocity universal joint 1 according to this embodiment. Next, detailed description is given of features of the present invention, specifically, the contact state and the angle β between the track groove and the ball, the wedge angle between the track grooves, the effective track length, and a relationship therebetween at a maximum operating angle.

First, referring to FIG. 7, detailed description is given of the contact state between the track groove and the ball at the time when the fixed type constant velocity universal joint according to this embodiment forms the maximum operating angle. FIG. 7(a) is a vertical sectional view of the constant velocity universal joint 1, and FIG. 7(b) is an enlarged view of a contact state between the track groove 7A of the outer joint member 2 and the ball 4. FIGS. 7(a) and 7(b) illustrate the track groove 7A of the outer joint member 2, and the illustration and description of the track groove 7B are omitted because the inclination direction of the track groove 7B is opposite to that of the track groove 7A and other structural details of the track groove 7B are the same as those of the track groove 7A. When the joint forms the maximum operating angle $\theta_{max}$ as illustrated in FIG. 7(a), a center Ob of the ball 4 is moved to a position of $\theta_{max}/2$ with respect to the plane P comprising the joint center O at the operating angle of 0°. At this time, a contact point So between the ball 4 and the second track groove portion 7Ab comes closest to the inlet chamfer 10. Note that, FIG. 7(a) illustrates the track grooves 7A and 9A under a state in which the cross sections taken along the plane M illustrated in FIG. 2(a) and the plane Q illustrated in FIG. 3(b) are turned to the inclination angle γ of 0°. Thus, there is a slight difference between the position of $\theta_{max}/2$ and an actual line of $\theta_{max}/2$, but $\theta_{max}/2$ is used for the sake of simplicity of description.

Figure 27B:
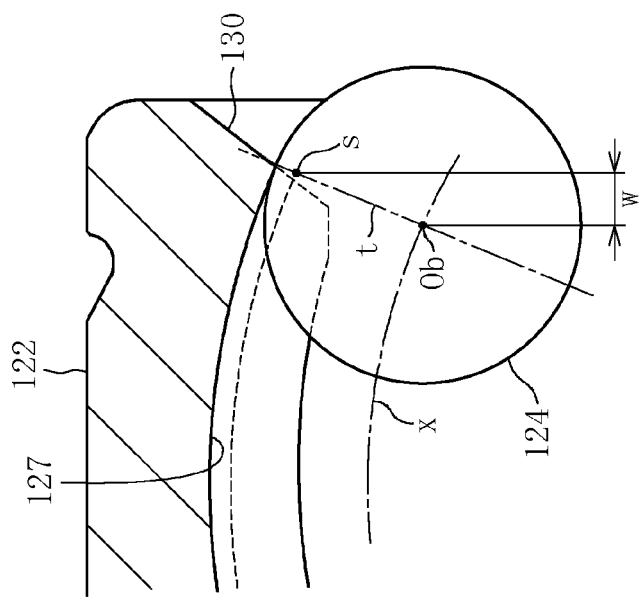
FIG. 27b is a partially enlarged view of the fixed type constant velocity universal joint.
Figure 27A:
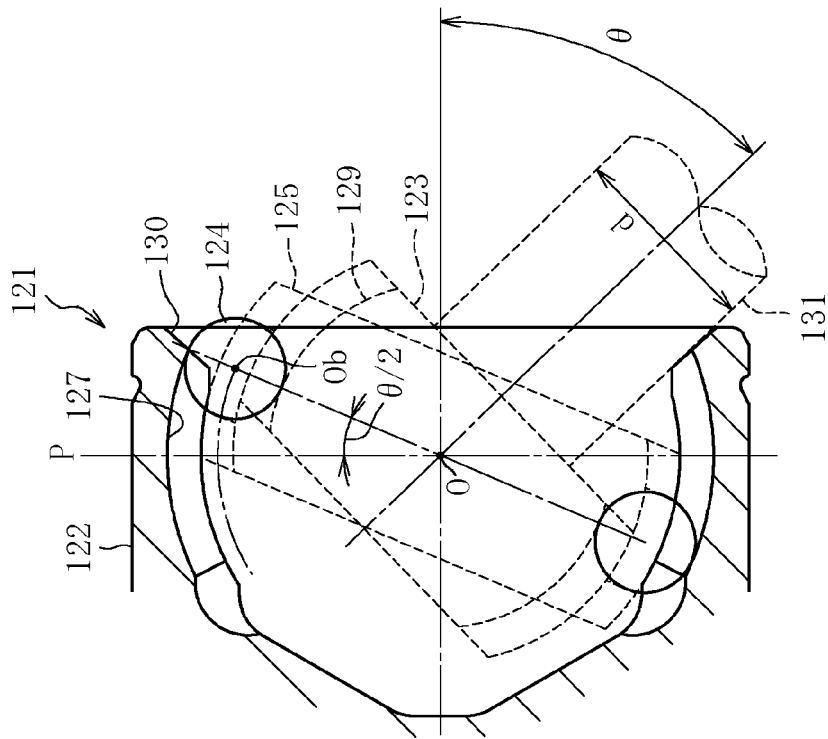
FIG. 27a is a vertical sectional view of the fixed type constant velocity universal joint according to the another related art.

The angle β that defines the end portion A of the arc-shaped ball raceway center line Xa of the first track groove portion 7Aa is set as large as 15°. Thus, after the arc-shaped ball raceway center line Xb of the second track groove 7Ab is connected to the end portion A, the arc-shaped ball raceway center line Xb is curved in an opposite direction so that the arc-shaped ball raceway center line Xb is formed substantially parallel to the joint axial line N-N at the end portion on the opening side of the outer joint member 2. With this, the wedge angle at the maximum operating angle can be suppressed. Detailed description thereof is given later. As illustrated on an enlarged scale in FIG. 7(b), the contact point So between the ball 4 and the track groove 7Ab is positioned in a plane T that passes through the center Ob of the ball 4 and is orthogonal to the ball raceway center line Xb. The ball raceway center line Xb is formed into an arc shape with respect to the curvature center Oo1, and hence a distance W in the axial direction between the center Ob of the ball 4 and the contact point So is smaller than that in the related-art constant velocity universal joint illustrated in FIG. 27(b). Accordingly, the effective track length described later is increased. Thus, in this embodiment, at the maximum operating angle, a track allowance amount U can be secured between an edge portion of the inlet chamfer 10 and the contact point So, and hence a sufficient contact state can be secured between the ball 4 and the track groove portion 7Ab. The track allowance amount U, which varies depending on joint sizes, is set to approximately from 0.5 mm to 2 mm.

As illustrated in FIG. 7(a), at the maximum operating angle, an allowance amount a is secured between a contact point between the ball 4, which is moved to the end of the radially outer side with respect to the pocket portion 5a of the cage 5, and the pocket portion 5a, and the spherical outer peripheral surface 12 of the cage 5. With this, a thickness of the cage 5 can be increased in the radial direction, and stress concentration on edge portions of rims of the pocket portions 5a can be alleviated. As a result, a higher strength of the cage 5 can be secured.

In relation to the angle β, description is given of an operating angle of a fixed type constant velocity universal joint to be used for an automotive drive shaft. First, a normal angle of the joint refers to an operating angle to be formed in a fixed type constant velocity universal joint of a front drive shaft of an automobile with one person onboard when the steering of the automobile is switched to a straightforward mode on a horizontal and flat road surface. In general, the normal angle is selected and determined within a range of from 2° to 15° in accordance with design conditions for vehicle types. In addition, the frequently used operating angle refers to an operating angle to be formed in the fixed type constant velocity universal joint of the above-mentioned automobile during, for example, continuous travel on a curved road, instead of a high operating angle to be formed at the time of, for example, right and left turns at a traffic intersection. This operating angle is also determined in accordance with the design conditions for vehicle types. The frequently used operating angle is supposed to be 20° at maximum.

When the operating angle θ is formed, the ball 4 is moved by θ/2 with respect to the plane P comprising the joint center O of the outer joint member 2 and the inner joint member 3. Thus, in order to adapt to the range of the frequently used operating angles including the normal angle in the constant velocity universal joint to be used for the automotive drive shaft, it is only necessary that the angle β be set to approximately 10°. However, in the present invention, as described above, the range of the angle β of from 14° to 16° has been found as a novel standard for suppressing a degree of the wedge angle between the second track groove portions 7b and 9b and securing a required maximum operating angle.

Further, based on the finding of the range of the angle β of from 14° to 16°, it has been found that, in this case, it is essential to set the end portion A of the ball raceway center line Xa of the first track groove portion 7a to a position of 60% of the effective track length on the opening side with respect to the joint center O. Detailed description thereof is given below.

Figure 8:
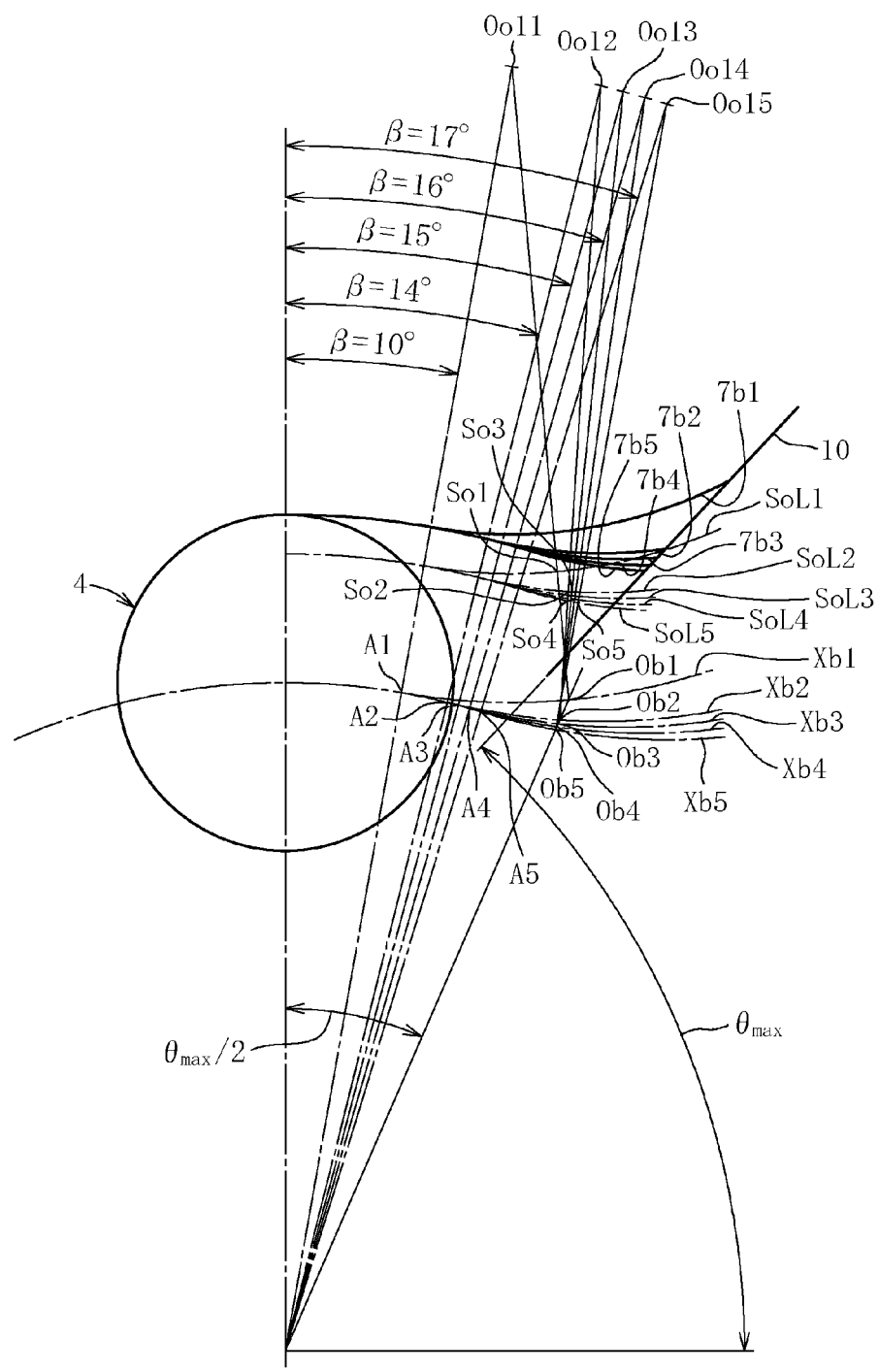
FIG. 8 is an explanatory view illustrating verification results of an angle β.

FIG. 8 illustrates states of the second track groove portion 7b in accordance with variation of the angle β that defines the position of the end portion A of the ball raceway center line Xa of the first track groove portion 7a. In FIG. 8, the curvature radius of the second track groove portion 7b is set uniform. As described above, the track groove 9 of the inner joint member 3 is mirror-image symmetrical with the track groove of the outer joint member 2, and hence illustration thereof is omitted. The ball 4 is positioned on the line of maximum operating angle $\theta_{max}/2$.

First, when the angle β that is necessary to adapt to the frequently used operating angles including the normal angle is 10°, the ball raceway center line Xa of the first track groove portion 7a has an end portion A1, a second track groove portion 7b1 has a curvature center Oo11, the second track groove portion 7b1 and the ball 4 are held in contact with each other at points on a trajectory SoL1, and the second track groove portion 7b1 has a ball raceway center line Xb1. Further, at the maximum operating angle, the ball 4 has a center Ob1, and is held in contact with the track groove portion 7b1 at a point So1.

Next, at the angle β of 14°, the ball raceway center line Xa of the first track groove portion 7a has an end portion A2, a second track groove portion 7b2 has a curvature center Oo12, the second track groove portion 7b2 and the ball 4 are held in contact with each other at points on a trajectory SoL2, and the second track groove portion 7b2 has a ball raceway center line Xb2. At the maximum operating angle, the ball 4 has a center Ob2, and is held in contact with the track groove portion 7b2 at a point Sot. At the angle β of 15°, the ball raceway center line Xa of the first track groove portion 7a has an end portion A3, a second track groove portion 7b3 has a curvature center Oo13, the second track groove portion 7b3 and the ball 4 are held in contact with each other at points on a trajectory SoL3, and the second track groove portion 7b3 has a ball raceway center line Xb3. At the maximum operating angle, the ball 4 has a center Ob3, and is held in contact with the track groove portion 7b3 at a point So3. At the angle β of 16°, the ball raceway center line Xa of the first track groove portion 7a has an end portion A4, a second track groove portion 7b4 has a curvature center Oo14, the second track groove portion 7b4 and the ball 4 are held in contact with each other at points on a trajectory SoL4, and the second track groove portion 7b4 has a ball raceway center line Xb4. At the maximum operating angle, the ball 4 has a center Ob4, and is held in contact with the track groove portion 7b4 at a point So4. Lastly, at the angle β of 17°, the ball raceway center line Xa of the first track groove portion 7a has an end portion A5, a second track groove portion 7b5 has a curvature center Oo15, the second track groove portion 7b5 and the ball 4 are held in contact with each other at points on a trajectory SoL5, and the second track groove portion 7b5 has a ball raceway center line Xb5. At the maximum operating angle, the ball 4 has a center Ob5, and is held in contact with the track groove portion 7b5 at a point Soy.

In this context, description is given on the effective track length. When the constant velocity universal joint 1 forms the maximum operating angle $\theta_{max}$, the ball 4 at a phase angle φ of 0° in FIG. 1(b) is moved to the end of the opening side of the outer joint member 2. At this time, the center Ob of the ball 4 is positioned on the line of $\theta_{max}/2$ (see FIG. 7(a) and FIG. 8). The center Ob of the ball 4 is always positioned on the inclined line of $\theta_{max}/2$ irrespective of the shape of the track groove 7. On the other hand, as illustrated in FIG. 8, the contact point So between the track groove 7 of the outer joint member 2 and the ball 4 varies in position in the axial direction of the joint in accordance with the shape of the track groove 7. In other words, when the operating angle θ is formed, a moving amount of the contact point So in the axial direction per unit angle (for example, 1°) varies in accordance with the shape of the track groove 7. Thus, in this specification, the effective track length on the opening side with respect to the joint center O refers to a length of the trajectory of the contact point of the track groove from the edge portion of the inlet chamfer 10 illustrated in FIG. 7(b) to the plane P comprising the joint center O in consideration of the above-mentioned state of variation in moving amount in the axial direction of the contact point So.

At the angle β of 10°, as illustrated in FIG. 8, the trajectory SoL1 of the contact point is curved so as to be largely opened toward the opening side of the outer joint member 2. As a result, the effective track length can be secured. However, at the maximum operating angle, the wedge angle between the track grooves becomes excessively higher (for example, 65°), and hence a great pushing-out force is generated on the ball 4. As a result, high loads are applied to the pockets of the cage 5, which causes a problem with the strength of the cage 5.

As a countermeasure, investigations of gradually increasing the angle β have been conducted in various patterns. As a result, it has been found that the degree of the wedge angle between the second track groove portions can be suppressed (approximately to 43°) and the required maximum operating angle (approximately 47°) can be secured by adjusting a curvature radius of the ball raceway center line Xb2 of the second track groove portion 7b2 with a lower limit of the angle β being set to 14°. In addition, it has been found that, also at the angles β of 15° and 16°, the degree of the wedge angle between the second track groove portions can be suppressed and the required maximum operating angle can be secured by adjusting curvature radii of the second track groove portions 7b3 and 7b4. However, it has been found that, when the angle β is increased to 17°, the degree of the wedge angle between the second track groove portions can be suppressed, but a curvature radius of the second track groove portion 7b5, at which the required maximum operating angle is secured, cannot be determined in terms of practical use. Therefore, it has been concluded that an upper limit of the angle β is set to 16°. Based on such finding of the range of from 14° to 16° of the angle β, it has been concluded that, in this case, it is essential to set the end portion A of the ball raceway center line Xa of the first track groove portion 7a to a position of 60% of the effective track length on the opening side with respect to the joint center O.

Figure 9B:
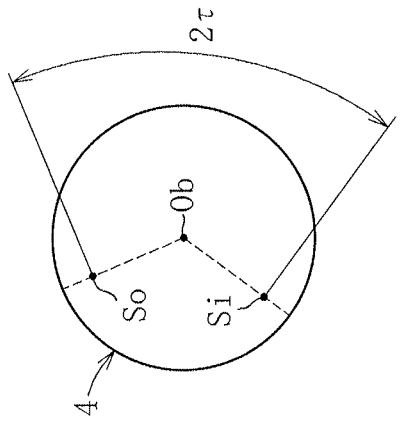
FIG. 9b is an enlarged view of the wedge angle.
Figure 9A:
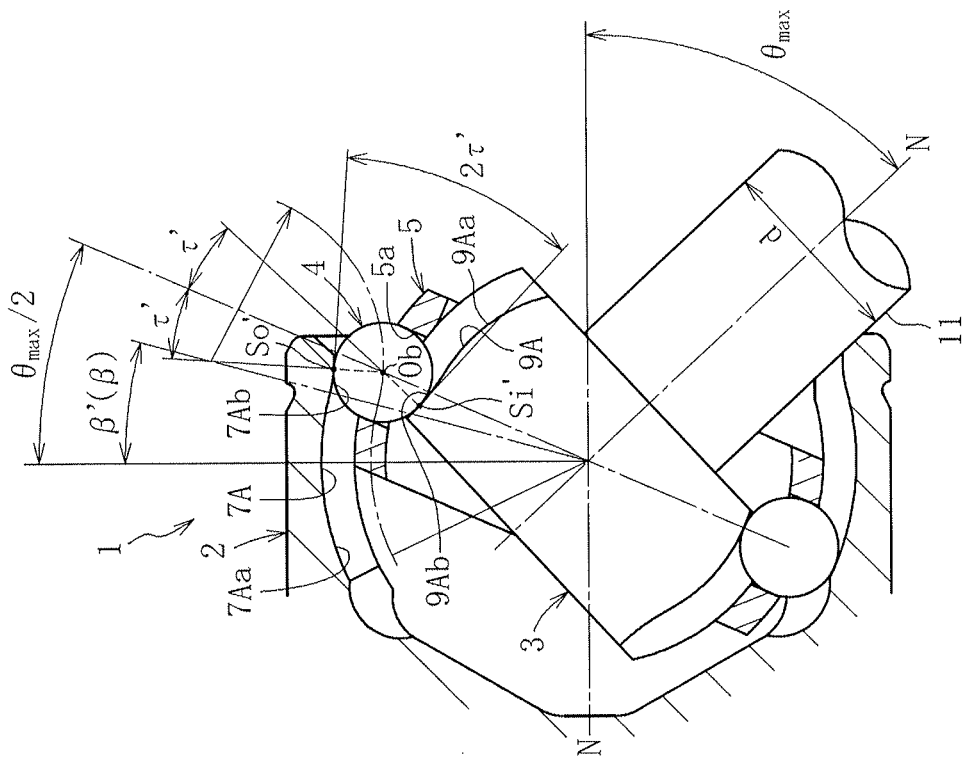
FIG. 9a is a view of a method of setting a shape of the track grooves and a wedge angle.

Next, referring to FIG. 9, description is given of a method of setting the track grooves into a shape that is three-dimensionally curved at the inclination angle γ, and a method of setting the wedge angle in the constant velocity universal joint according to this embodiment. FIG. 9(a) is a vertical sectional view of the constant velocity universal joint 1. As described above, FIG. 9(a) illustrates the track grooves 7A and 9A under a state in which the cross sections taken along the plane M illustrated in FIG. 2(a) and the plane Q illustrated in FIG. 3(b) are turned to the inclination angle γ of 0°, and illustrates a wedge angle in two-dimensional cross section, which is formed between groove bottoms of the track grooves 7A and 9A. FIG. 9(b) illustrates an actual wedge angle in a three-dimensional space.

Specifically, the track grooves 7A and 7B on the upper side in FIG. 9(a) correspond to those at the phase angle φ of 0° in FIG. 1(b), that is, those at the phase angle φ of 0° with respect to the joint center O. At the phase angle φ of 0°, the ball 4 is moved to the end of the opening side of the track groove 7A of the outer joint member 2, and to the end of the interior side of the track groove 9A of the inner joint member 3. Under the state of the phase angle φ of 0°, when rotational torque in a direction of a hollow arrow is applied to the inner joint member 3 illustrated in FIG. 1(b), a wedge angle between the track groove 7A (second track groove portion 7Aa) and the track groove 9A (second track groove portion 9Aa), which has a wedge angle component that is directed to the opening side due to the inclination angle γ, becomes highest. A wedge angle between the track groove 7B (second track groove portion 7Ba) and the track groove 9B (second track groove portion 9Ba) that are inclined in the opposite directions is lower than the wedge angle between the track groove 7A (second track groove portion 7Aa) and the track groove 9A (second track groove portion 9Aa) at the same phase angle φ of 0°. This is because a wedge angle component thereof is directed to the interior side due to the inclination angle γ.

A wedge angle to be formed between the groove bottoms of the track grooves 7A and 9A in two-dimensional cross section of FIG. 9(a) is represented by 2τ'. The wedge angle 2τ' refers to an angle to be formed between a straight line So'Ob and a straight line Si'Ob. The wedge angle 2τ' becomes highest at the phase angle φ of 0°, and generates the great pushing-out force on the ball 4, which is applied as the high pocket loads to the pocket portions 5a of the cage 5. In this way, the wedge angle 2τ' is the most influential factor on performance of the constant velocity universal joint 1 at high angles.

The actual wedge angle in the constant velocity universal joint 1 needs to be investigated in the three-dimensional space, which is illustrated as a wedge angle $2\tau$ in FIG. 9(b). The ball 4 and the track groove 7A are held in contact with each other at the points So, and the ball and the track groove 9A are held in contact with each other at the points Si (see FIG. 10). As compared to the wedge angle $2\tau'$ in two-dimensional cross section, the actual wedge angle $2\tau$ is influenced by contact angles $\delta$ of the ball and the inclination angle $\gamma$ of the track groove. Thus, $2\tau$ and $2\tau'$ are unequal to each other. In consideration of the influences of the contact angles $\delta$ and the inclination angle $\gamma$, a relationship between $2\tau$ and $2\tau'$ at the phase angle $\phi$ of $0°$ is approximately expressed by the following equation.

$$(2\tau) = (2\tau')\cos\delta + (2\gamma)\sin\delta \qquad (1)$$

Note that, this approximate equation is established only in two-dimensional cross section in which the cross sections taken along the plane M and the plane Q at the phase angle $\phi$ of $0°$ are turned to the inclination angle $\gamma$ of $0°$.

Examples of the fixed type constant velocity universal joint comprise a Rzeppa type constant velocity universal joint and an undercut-free constant velocity universal joint (hereinafter abbreviated as UJ). For example, in a case where the UJ, which is widely available in the automotive market, forms a maximum operating angle of $50°$, when $2\tau'=50°$, $\gamma=0°$, and the contact angle $\delta=30°$ to $50°$ are substituted into the equation (1), the actual wedge angle $2\tau$ ranges from $32°$ to $43°$. As the wedge angle is smaller, advantages in strength and durability become greater. Thus, in this embodiment, the wedge angle $2\tau$ at the maximum operating angle is set to $43°$ or less. With this, equivalent strength and durability can be secured in the same joint size as that of the UJ. In other words, increases in cost and weight due to an increase in size of the joint can be suppressed.

Next, description is given of a procedure for setting the wedge angle so as to satisfy $2\tau \leq 43°$. In order to set parameters of the constant velocity universal joint 1 so that $2\tau \leq 43°$ is established at the maximum operating angle, it is only necessary that $\tau'$ that is calculated from a drawing of the two-dimensional cross section in which the cross sections taken along the plane M and the plane Q at the phase angle $\phi$ of $0°$ are turned to the inclination angle $\gamma$ of $0°$ be converted to $\tau$ based on the equation (1) so that $2\tau$ is set to $43°$ or less. The wedge angle $2\tau'$ in two-dimensional cross section in which the cross sections taken along the plane M and the plane Q at the phase angle $\phi$ of $0°$ are turned to the inclination angle $\gamma$ of $0°$ is simplified as a wedge angle $2\tau'$ in two-dimensional cross section at the phase angle $\phi$ of $0°$. This simplified expression is commonly used in this specification and the claims. Specifically, when the maximum operating angle $\theta_{max}$ is set to $47°$, the inclination angle $\gamma$ is set to $6°$, and the contact angle $\beta$ is set to $40°$, based on the equation (1), the wedge angle $2\tau'$ in two-dimensional cross section at the phase angle $\phi$ of $0°$ can be calculated to $46°$ or less, to thereby satisfy $2\tau \leq 43°$. In this embodiment, the parameters are set so as to satisfy $2\tau' \leq 46°$. In this way, parameters of the track grooves can be determined based on the wedge angle $2\tau'$ in two-dimensional cross section at the phase angle $\phi$ of $0°$, and hence work of setting the parameters of the track grooves can be markedly simplified. Further, such setting of the parameters enables strength and durability at the maximum operating angle to be secured equivalently to those of the UJ.

When the inclination angle $\gamma$ is excessively low, a force of holding the balls in a bisecting plane due to crossing between the track grooves 7 and 9 becomes smaller. As a result, operability is deteriorated. In contrast, when the inclination angle $\gamma$ is excessively high, the track grooves of the outer joint member 2 and the inner joint member 3 overlap with each other at the end portions within a short distance, and hence the track length cannot be sufficiently secured. Therefore, it is desired that the inclination angle $\gamma$ range from $4°$ to $8°$.

Figure 10:
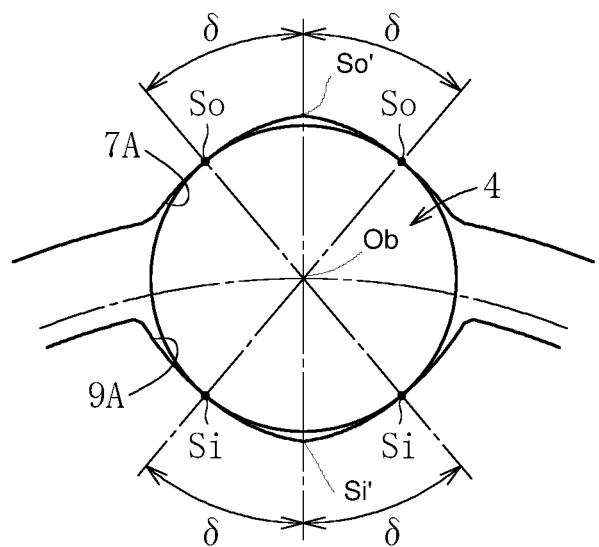
FIG. 10 is a horizontal sectional view of the track grooves.

Further, in consideration of contact pressure, it is desired that the contact angles $\delta$ range from $30°$ to $45°$ that are widely available in the Rzeppa type constant velocity universal joints and the UJs. FIG. 10 illustrates the contact angles between the track grooves 7A and 9A and the ball 4. The track grooves 7A and 9A are formed into an elliptical shape or a Gothic arch shape in horizontal cross section, and the track grooves 7A and 9A are held in what is called angular contact with the ball 4 at the contact angles 6. Thus, the ball 4 is held in contact with the contact points So and Si on side surface sides of the track grooves 7A and 9A, which are slightly spaced apart from the groove bottoms of the track grooves 7A and 9A.

Figure 11:
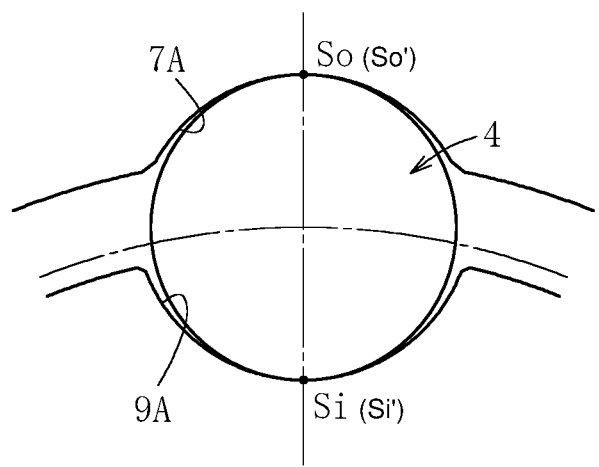
FIG. 11 is a horizontal sectional view of the track grooves.

FIG. 11 illustrates a case where the track grooves 7A and 9A and the ball 4 are held in circular contact with each other. In this case, the contact angle $\beta$ is $0°$. Thus, based on the wedge angle $2\tau \leq 43°$ at the maximum operating angle, the wedge angle $2\tau'$ in two-dimensional cross section at the phase angle $\phi$ of $0°$ can be easily calculated by substituting $\delta=0°$ into the equation (1) described above.

Figure 12B:
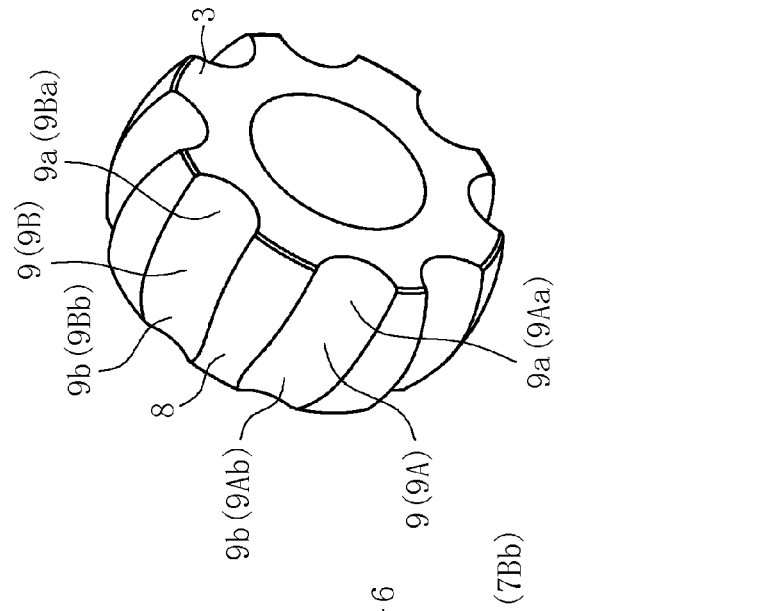
FIG. 12b is a perspective view of the inner joint member.
Figure 12A:
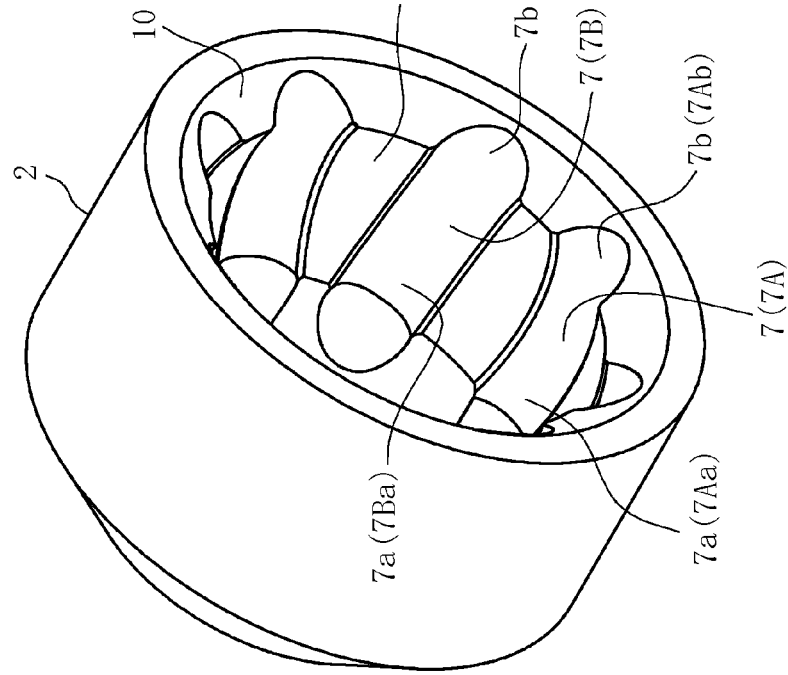
FIG. 12a is a perspective view of the outer joint member.

FIG. 12 are perspective views of the outer joint member 2 and the inner joint member 3 of the constant velocity universal joint according to this embodiment. Those perspective views illustrate the above-mentioned track grooves in a three-dimensional manner. As illustrated in FIG. 12(a), the track grooves 7A and 7B inclined in the peripheral direction with respect to the joint axial line N-N (not shown) are alternately formed in the spherical inner peripheral surface 6 of the outer joint member 2 with their inclination directions alternately opposite to each other. Each track groove 7A comprises the first track groove portion 7Aa and the second track groove portion 7Ab, and each track groove 7B comprises the first track groove portion 7Ba and the second track groove portion 7Bb. The inlet chamfer 10 is provided at the opening end of the outer joint member 2. Further, as illustrated in FIG. 12(b), the track grooves 9A and 9B inclined in the peripheral direction with respect to the joint axial line N-N (not shown) are alternately formed in the spherical outer peripheral surface 8 of the inner joint member 3 with their inclination directions alternately opposite to each other. Each track groove 9A comprises the first track groove portion 9Aa and the second track groove portion 9Ab, and each track groove 9B comprises the first track groove portion 9Ba and the second track groove portion 9Bb.

Figure 13:
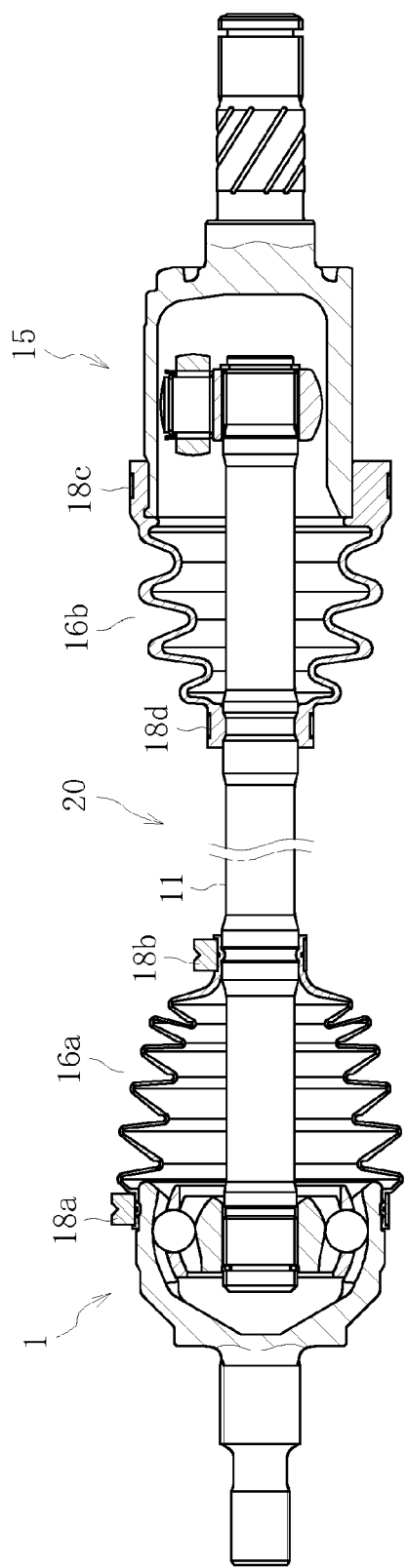
FIG. 13 is a view of a state in which the fixed type constant velocity universal joint according to the first embodiment is used for an automotive drive shaft.

FIG. 13 illustrates an automotive front drive shaft 20, to which the fixed type constant velocity universal joint 1 according to this embodiment is applied. The fixed type constant velocity universal joint 1 is coupled to one end of an intermediate shaft 11, and a plunging tripod type constant velocity universal joint 15 is coupled to another end thereof. At positions between an outer peripheral surface of the fixed type constant velocity universal joint 1 and an outer peripheral surface of the shaft 11 and between an outer peripheral surface of the plunging tripod type constant velocity universal joint 15 and the outer peripheral surface of the shaft 11, bellows boots 16a and 16b are mounted and fixed with boot bands 18a, 18b, 18c, and 18d, respectively. Grease is sealed inside the joint as a lubricant. Through use of the fixed type constant velocity universal joint 1 according to this embodiment, it is possible to attain a lightweight and compact automotive drive shaft 20 that is suppressed in torque loss and heat generation, enhanced in efficiency, and is capable of forming high operating angles.

Figure 14:
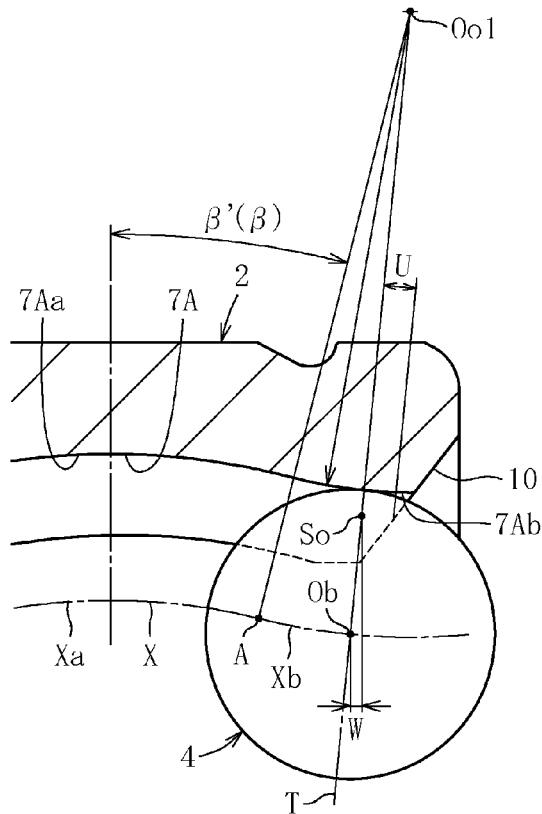
FIG. 14 is a view of a contact state between the ball and the track groove at a maximum operating angle of a joint according to a first modification of the first embodiment.

FIG. 14 illustrates a first modification of the first embodiment. This modification is different from the first embodiment in angle β that defines the end portion A. The angle β is set to 14°, the second track groove portion 7Ab has the curvature center Oo1, and a curvature radius is formed so as to be larger than that in the first embodiment. In this modification, the position of the end portion A is set so as to occupy 60% of the effective track length on the opening side with respect to the joint center O. In this embodiment, at the maximum operating angle, a track allowance amount U having the same dimension as that in the first embodiment can be secured between the edge portion of the inlet chamfer 10 and a contact point S, and the effective track length is the same as that in the first embodiment. With this, the contact state between the ball 4 and the track groove portion 7Ab can be sufficiently secured.

Figure 15:
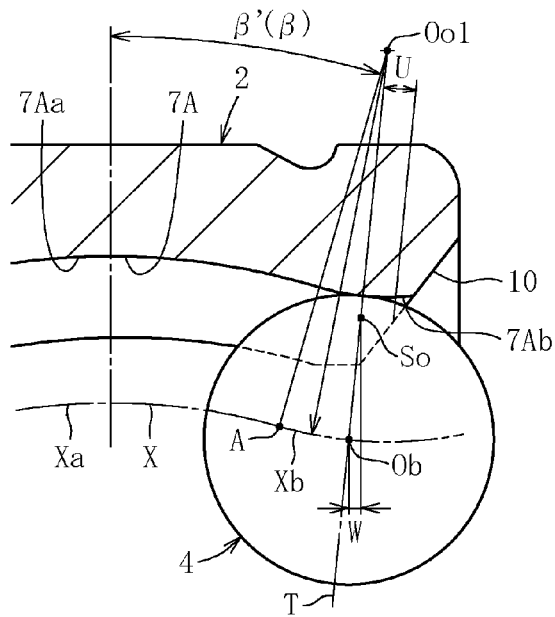
FIG. 15 is a view of a contact state between the ball and the track groove at a maximum operating angle of a joint according to a second modification of the first embodiment.

FIG. 15 illustrates a second modification of the first embodiment. In this modification, the angle β that defines the end portion A is set to 16°, the second track groove portion 7Ab has the curvature center Oo1, and a curvature radius is formed so as to be smaller than that in the first embodiment. In this modification, the position of the end portion A is set so as to occupy 62% of the effective track length on the opening side with respect to the joint center O. With this, in this embodiment, at the maximum operating angle, a track allowance amount U having the same dimension as that in the first embodiment can be secured between the edge portion of the inlet chamfer 10 and the contact point S, and the effective track length is the same as those in the first embodiment and the first modification. The contact state between the ball 4 and the track groove portion 7Ab can be sufficiently secured. In this way, the effective track length can be adjusted, for example, with the shape and curvatures of the track grooves.

Figure 16:
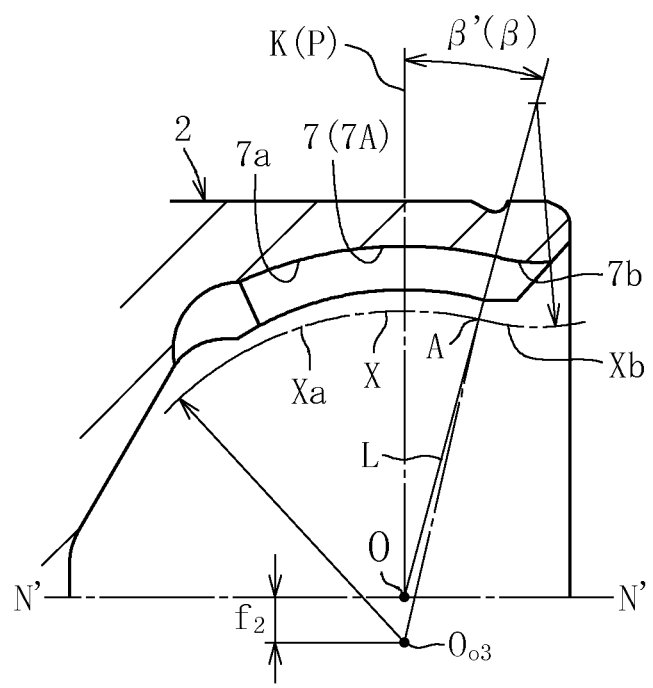
FIG. 16 is a vertical sectional view of an outer joint member of a fixed type constant velocity universal joint according to a second embodiment of the present invention.

Next, referring to FIG. 16, description is given of a fixed type constant velocity universal joint according to a second embodiment of the present invention. FIG. 16 is a vertical sectional view as viewed in the plane M comprising the ball raceway center line X of the track groove 7A and the joint center O as in FIG. 4 (see FIG. 2(a)), for illustrating only an outer joint member of the fixed type constant velocity universal joint according to this embodiment. Further, FIG. 16 illustrates an upper half in the radial direction with respect to the axial line of the outer joint member. This fixed type constant velocity universal joint is different from the fixed type constant velocity universal joint according to the first embodiment described above in that the curvature center of the arc-shaped ball raceway center line of the first track groove portion is offset in the radial direction with respect to the joint axial line N-N and that a configuration of the straight ball raceway center line of the second track groove portion is adjusted in accordance therewith. Other structural details are the same as those in the first embodiment. Also in this embodiment, the parts having the functions similar to those in the first embodiment are represented by the same reference symbols, and redundant description thereof is omitted. The same apples to the embodiments to be described below.

The end portion A on the opening side of the ball raceway center line Xa of the first track groove portion 7a of the outer joint member 2 is the same as that in the first embodiment. However, a curvature center $O_{o3}$ of the ball raceway center line Xa of the first track groove portion 7a is not offset in the axial direction with respect to the joint center O, but offset by $f_2$ in the radial direction with respect to the joint axial line. In accordance therewith, the arc-shaped ball raceway center line Xb of the second track groove portion 7b is adjusted so that the arc-shaped ball raceway center line Xb is connected to the end portion A on the opening side of the ball raceway center line Xa of the first track groove portion 7a. Also in this embodiment, the angle β that defines the end portion A is set to 15°. With this configuration, the track groove depths on the interior side of the joint can be adjusted. Also in the fixed type constant velocity universal joint according to this embodiment, although illustration is omitted, the ball raceway center line Y of the track groove 9 of the inner joint member 3 is formed so as to be mirror-image symmetrical with the ball raceway center line X of the paired track groove 7 of the outer joint member 2 with respect to the plane P comprising the joint center O at the operating angle of 0°. Inclined states of the track grooves 7 and 9 of the outer joint member 2 and the inner joint member 3 in the peripheral direction with respect to the joint axial line N-N, a configuration of the cage 5, and functions of the joint are the same as those of the fixed type constant velocity universal joint according to the first embodiment. Thus, redundant description thereof is omitted.

Referring to FIG. 17, description is given of a fixed type constant velocity universal joint according to a third embodiment of the present invention. The fixed type constant velocity universal joint according to this embodiment is different from the fixed type constant velocity universal joint according to the first embodiment in that curvature centers of the spherical outer peripheral surface and the spherical inner peripheral surface of the cage are offset in the axial direction with respect to the joint center O. Other structural details are the same as those in the first embodiment.

Figure 17A:
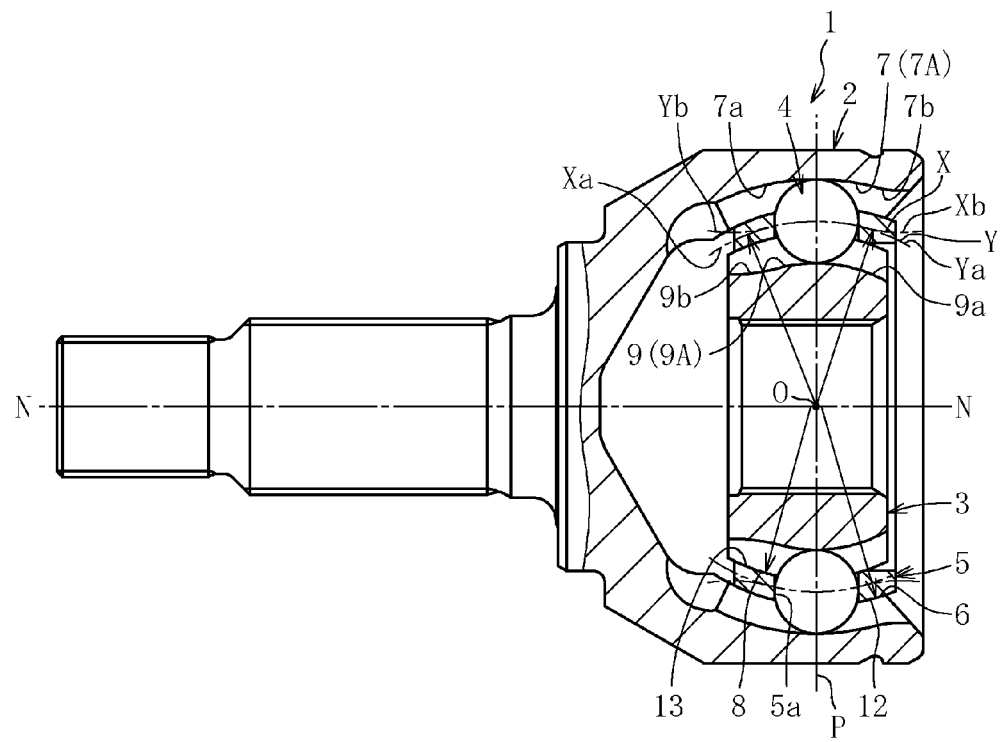
FIG. 17a is a vertical sectional view of an outer joint member of a fixed type constant velocity universal joint according to a third embodiment of the present invention.
Figure 17B:
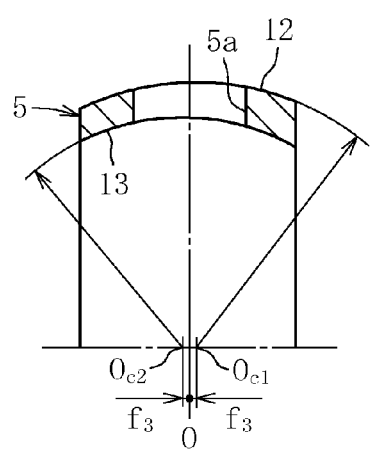
FIG. 17b is a vertical sectional view of a cage of the fixed type constant velocity universal joint.

FIG. 17(a) is a partial vertical sectional view of the fixed type constant velocity universal joint, and FIG. 17(b) is a vertical sectional view of the cage. FIG. 17(a) also illustrates the track grooves 7 and 9 under a state in which the cross sections taken along the plane M illustrated in FIG. 2(a) and the plane Q illustrated in FIG. 3(b) are turned to the inclination angle γ of 0°. A curvature center $O_{c1}$ of the spherical outer peripheral surface 12 and a curvature center $O_{c2}$ of the spherical inner peripheral surface 13 of the cage 5 are offset in the axial direction by $f_3$ with respect to the joint center O. With this offset configuration, the thickness of the cage 5 is gradually increased toward the opening side, and hence the strength of the cage 5 can be enhanced particularly at high operating angles. As described above, in the range of high operating angles, the balls 4 arranged in the peripheral direction are temporarily separately positioned between the first track groove portions 7Aa and 9Aa (7Ba and 9Ba; see FIGS. 2(a) and 3(b)) and between the second track groove portions 7Ab and 9Ab (7Bb and 9Bb, see FIGS. 2(a) and 3(b)). In this case, the pressing forces toward the opening side are applied from the balls 4 positioned between the second track groove portions 7Ab and 9Ab (7Bb and 9Bb) to the pocket portions 5a of the cage 5. However, the thickness of the cage 5 is gradually increased toward the opening side, and hence the strength of the cage 5 can be enhanced. Further, the track groove depths of the track grooves 7a and 9b on the interior side can be increased. Also in this embodiment, inclined states of the track grooves 7 and 9 of the outer joint member 2 and the inner joint member 3 in the peripheral direction with respect to the joint axial line N-N, a configuration of the cage 5, and functions of the joint are the same as those of the fixed type constant velocity universal joint according to the first embodiment. Thus, redundant description thereof is omitted.

Referring to FIGS. 18 to 22, description is given of a fixed type constant velocity universal joint according to a fourth embodiment of the present invention. The fixed type constant velocity universal joint according to this embodiment is different from the fixed type constant velocity universal joint according to the first embodiment in the configuration of the second track groove portion. Other structural details are the same as those in the first embodiment.

Figure 18:
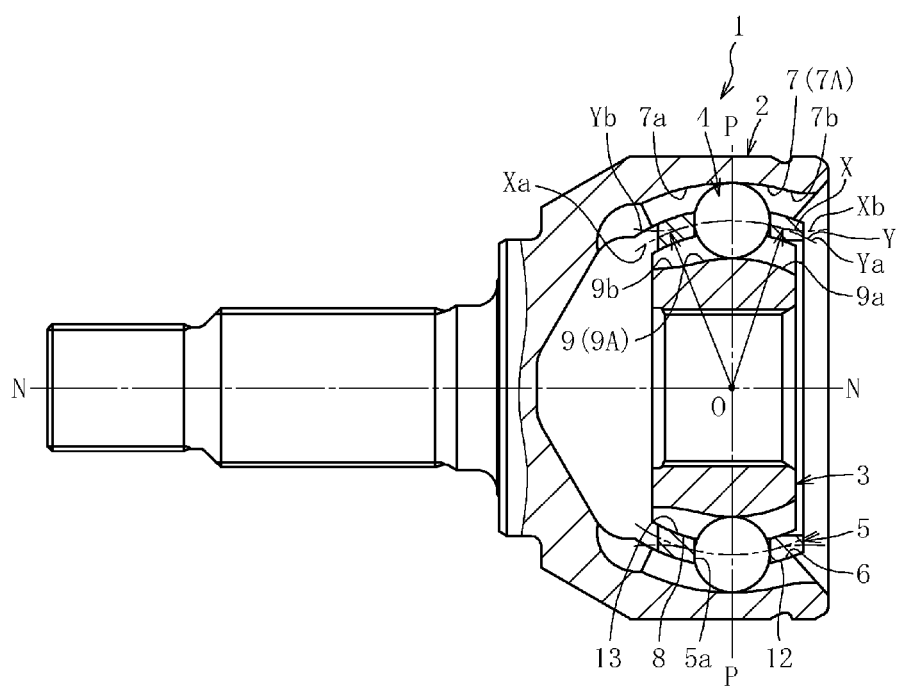
FIG. 18 is a partial vertical sectional view of a fixed type constant velocity universal joint according to a fourth embodiment of the present invention.

As illustrated in FIG. 18, in a vertical cross section, the fixed type constant velocity universal joint according to this embodiment has substantially the same shape as that in the first embodiment, including the shape of the second track groove portion. FIG. 18 also illustrates the track grooves 7 and 9 under a state in which the cross sections taken along the plane M illustrated in FIG. 2(a) and the plane Q illustrated in FIG. 3(b) are turned to the inclination angle γ of 0°. The track groove 7 of the outer joint member 2 has the ball raceway center line X, and comprises the first track groove portion 7a having the arc-shaped ball raceway center line Xa that has the curvature center at the joint center O, and the second track groove portion 7b having the arc-shaped ball raceway center line Xb that is curved in the opposite direction to that of the first track groove portion 7a. The ball raceway center line Xb of the second track groove portion 7b is connected smoothly to the ball raceway center line Xa of the first track groove portion 7a. On the other hand, the track groove 9 of the inner joint member 3 has the ball raceway center line Y, and comprises the first track groove portion 9a having the arc-shaped ball raceway center line Ya that has the curvature center at the joint center O, and the second track groove portion 9b having the arc-shaped ball raceway center line Yb that is curved in the opposite direction to that of the first track groove portion 9a. The ball raceway center line Yb of the second track groove portion 9b is connected smoothly to the ball raceway center line Ya of the first track groove portion 9a.

Figure 19:
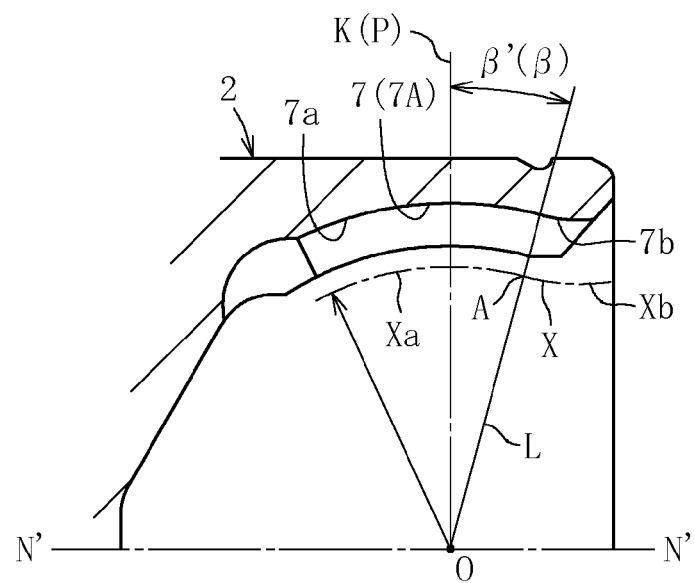
FIG. 19 is a vertical sectional view of an outer joint member of the fixed type constant velocity universal joint.
Figure 20:
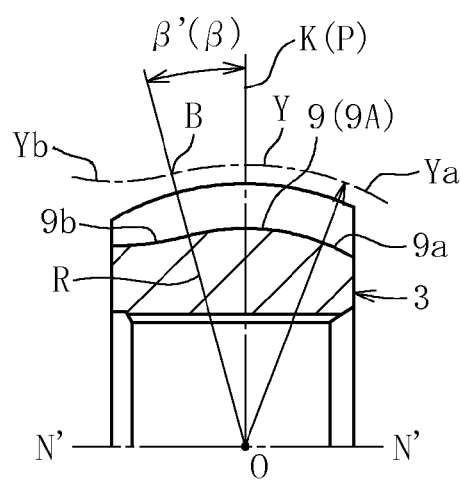
FIG. 20 is a vertical sectional view of an inner joint member of the fixed type constant velocity universal joint.

As illustrated in FIG. 19, in a region up to the end portion A on the opening side of the ball raceway center line Xa, the first track groove portion 7a of the outer joint member 2 has the same shape as that in the first embodiment. However, the ball raceway center line Xb of the second track groove portion 7b is different from that in the first embodiment. According to this embodiment, the curvature center of the arc-shaped ball raceway center line Xb of the second track groove portion 7b of the outer joint member 2 is set to a position out in the peripheral direction of the plane M comprising the ball raceway center line X of the track groove and the joint center O (see FIG. 21) (not shown). Further, the arc-shaped ball raceway center line Xb is set so as to have an appropriate curvature so that the arc-shaped ball raceway center line Xb is connected smoothly to the end portion A on the opening side of the ball raceway center line Xa of the first track groove portion 7a. The same applies to the ball raceway center line Yb of the second track groove portion 9b of the inner joint member 3 illustrated in FIG. 20. The ball raceway center line Y of the track groove 9 of the inner joint member 3 is formed so as to be mirror-image symmetrical with the ball raceway center line X of the paired track groove 7 of the outer joint member 2 with respect to the plane P comprising the joint center O at the operating angle of 0°.

Figure 21:
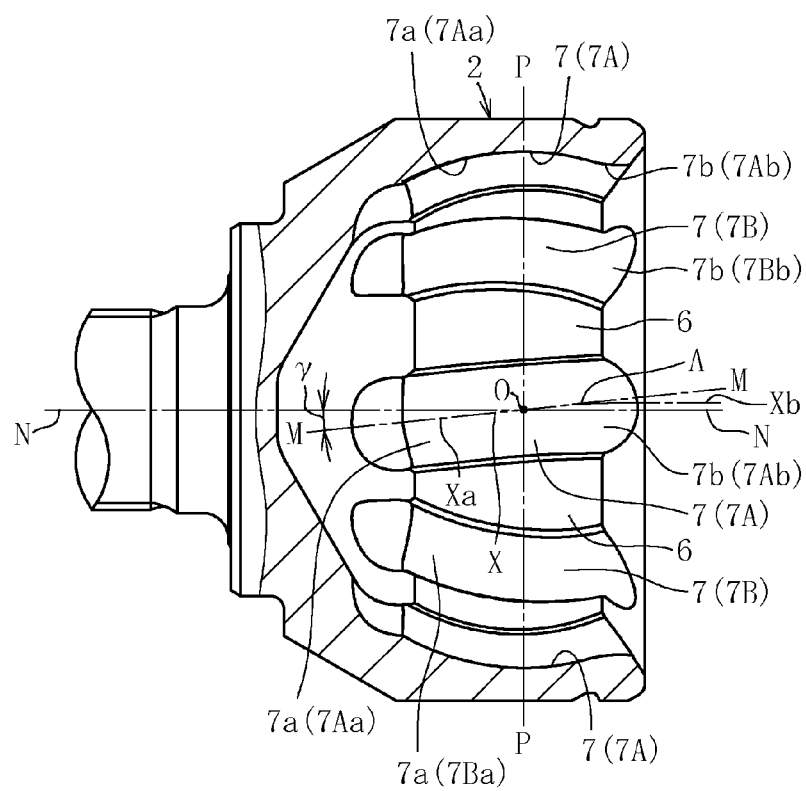
FIG. 21 is a partial vertical sectional view of an inner peripheral shape of the outer joint member of the fixed type constant velocity universal joint.

Referring to FIG. 21, description is given of a state in which the track grooves 7 of the outer joint member 2 are inclined in the peripheral direction with respect to the joint axial line N-N. The plane M comprising the ball raceway center line Xa of the first track groove 7Aa of the outer joint member 2 and the joint center O is inclined at the angle γ with respect to the joint axial line N-N. In addition, in the case of the first track groove portion 7Ba adjacent to the first track groove portion 7Aa in the peripheral direction, although illustration is omitted, the plane M comprising the ball raceway center line Xa of the first track groove portion 7Ba and the joint center O is inclined at the angle γ with respect to the joint axial line N-N in the opposite direction to the inclination direction of the first track groove portion 7Aa. As described above, in this embodiment, only the first track groove portions 7Aa and 7Ba are formed in the plane M. Further, in this embodiment, after the ball raceway center line Xb of the second track groove portion 7Ab is connected smoothly to the end portion A on the opening side of the ball raceway center line Xa of the first track groove portion 7Aa, the ball raceway center line Xb is gently curved in a manner that the inclination angle becomes gradually lower toward the opening side. In this way, the inclination angle of 0° is formed near the opening end portion. The ball raceway center line Xb of the second track groove portion 7Bb, which is inclined in the opposite direction, is formed in the same way.

Figure 22:
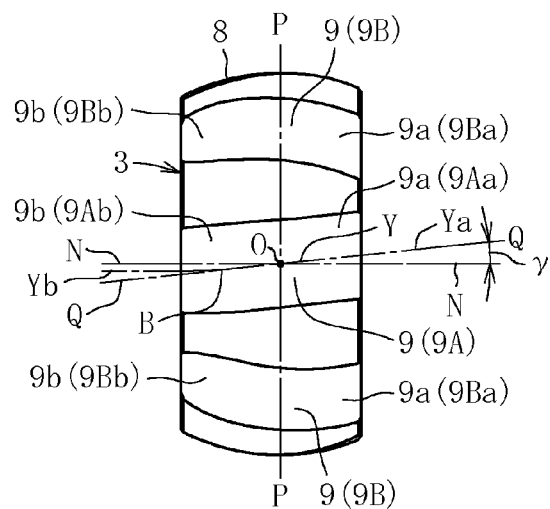
FIG. 22 is a view of an outer peripheral shape of the inner joint member of the fixed type constant velocity universal joint.
Figure 23B:
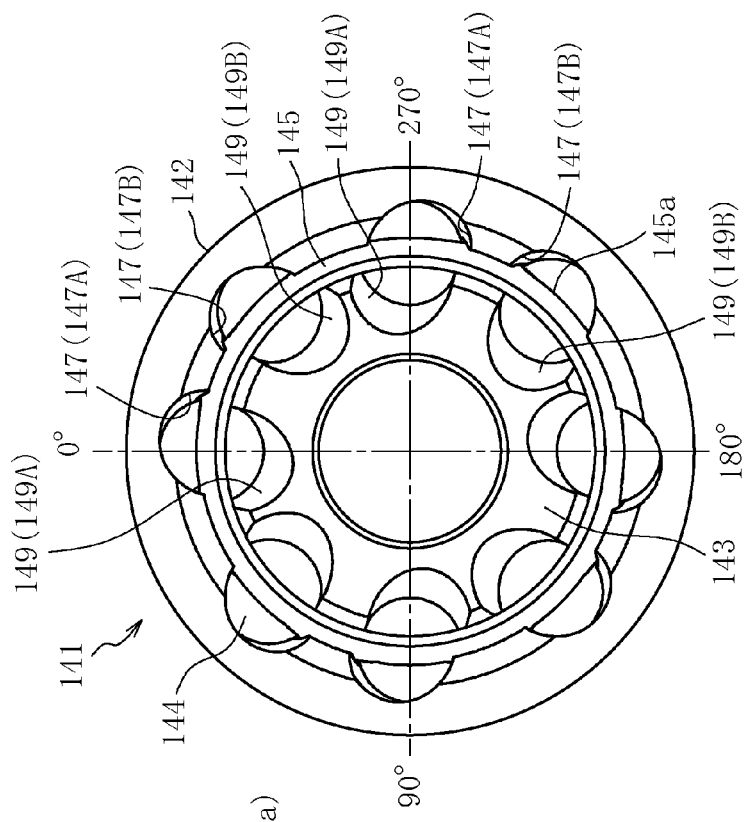
FIG. 23b is a side view of the fixed type constant velocity universal joint, for illustrating the technical findings in the course of the development of the present invention.
Figure 23A:
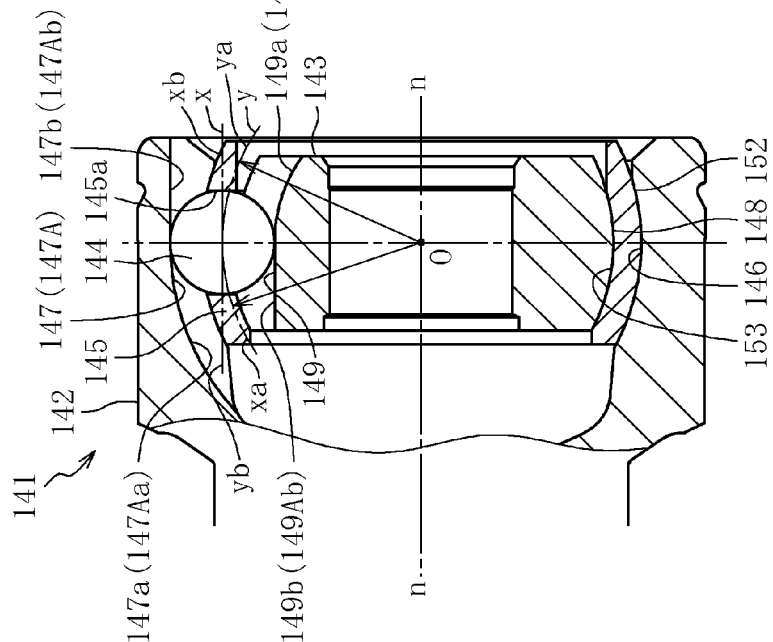
FIG. 23a is a vertical sectional view of a fixed type constant velocity universal joint, for illustrating technical findings in the course of development of the present invention.
Figure 24:
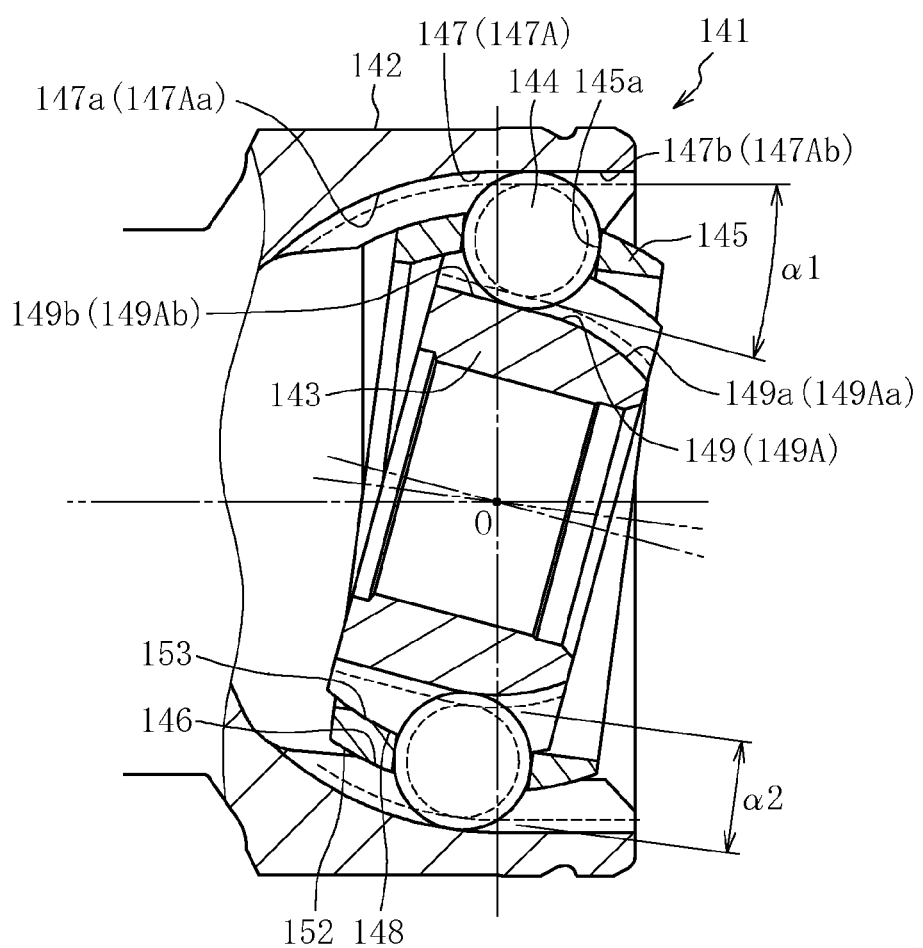
FIG. 24 is an explanatory view illustrating the technical findings in the course of the development of the present invention.
Figure 25A:
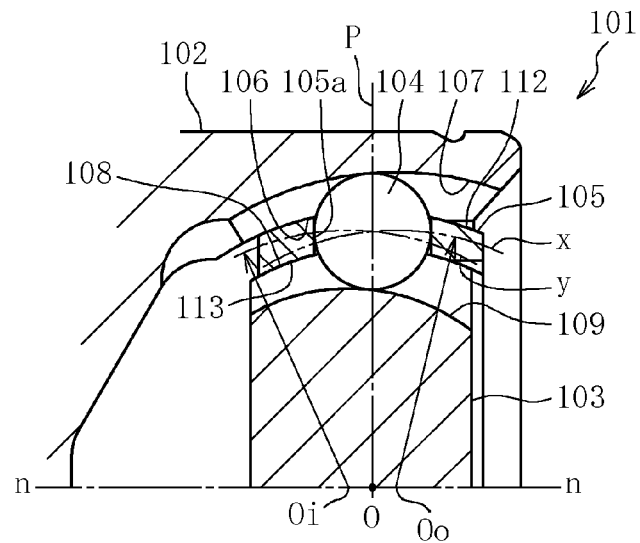
FIG. 25a is a vertical sectional view of a fixed type constant velocity universal joint according to a related art.
Figure 25B:
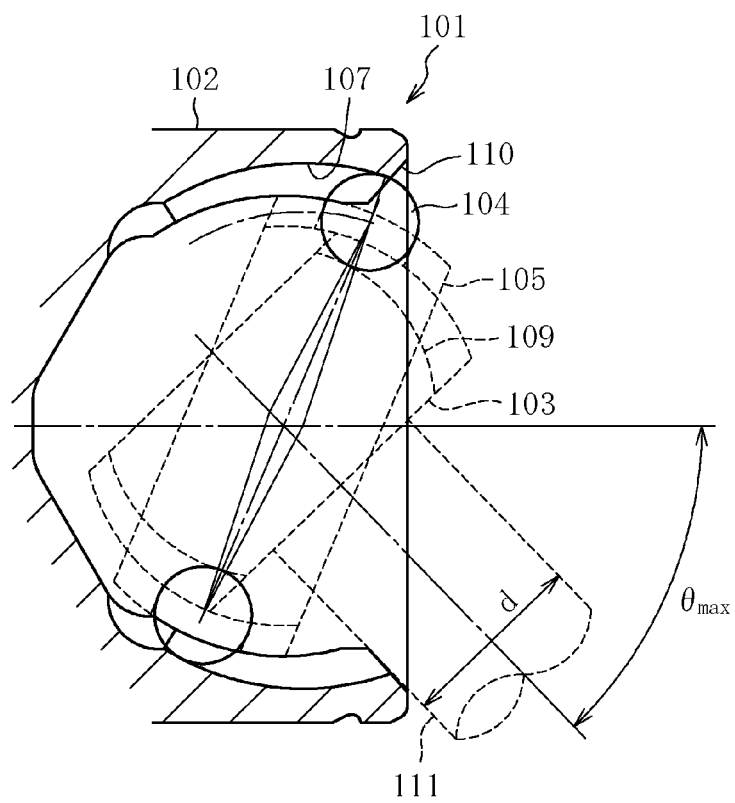
FIG. 25b is a view of a state in which the fixed type constant velocity universal joint forms a maximum operating angle.
Figure 26:
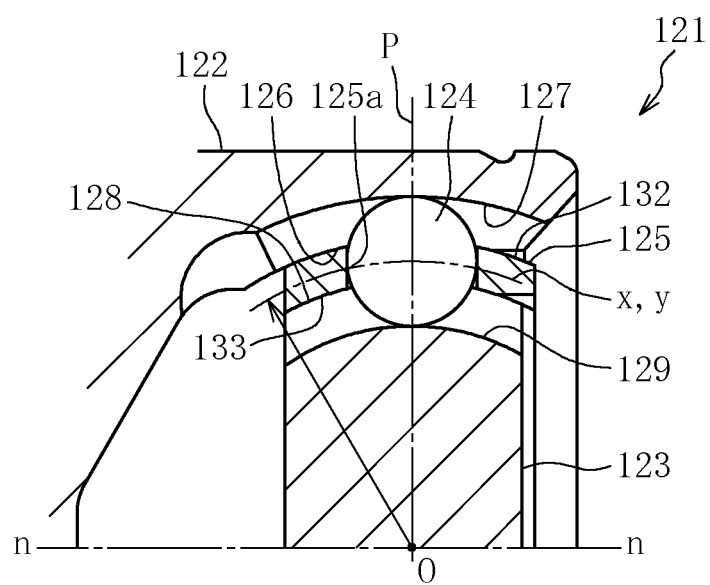
FIG. 26 is a vertical sectional view of a fixed type constant velocity universal joint according to another related art.

Referring to FIG. 22, description is given of a state in which the track grooves 9 of the inner joint member 3 are inclined in the peripheral direction with respect to the joint axial line N-N. The plane Q comprising the ball raceway center line Ya of the first track groove portion 9Aa of the inner joint member 3 and the joint center O is inclined at the angle γ with respect to the joint axial line N-N. In addition, in the case of the first track groove portion 9Ba adjacent to the first track groove portion 9Aa in the peripheral direction, although illustration is omitted, the plane Q comprising the ball raceway center line Ya of the first track groove portion 9Ba and the joint center O is inclined at the angle γ with respect to the joint axial line N-N in the opposite direction to the inclination direction of the first track groove portion 9Aa. Similarly to the above-mentioned track groove of the outer joint member 2, after the ball raceway center line Yb of the second track groove portion 9Ab of the inner joint member 3 is connected smoothly to the end portion B on the interior side of the ball raceway center line Ya of the first track groove portion 9Aa, the ball raceway center line Yb is gently curved in a manner that the inclination angle becomes gradually lower toward the interior side. In this way, the inclination angle of 0° is formed near the interior end portion. Note that, the ball raceway center line Yb of the second track groove portion 9Bb, which is inclined in the opposite direction, is formed in the same way.

The second track groove portions 7Ab and 7Bb of the outer joint member 2 and the second track groove portions 9Ab and 9Bb of the inner joint member 3 are formed as described above. Thus, the intervals on the approaching side between the second track groove portions 7Ab and 7Bb and the second track groove portions 9Ab and 9Bb, which are adjacent to each other in the peripheral direction, and the intervals on the separating side are reduced therebetween. Thus, differences between the intervals can be reduced in the peripheral direction. With this, a difference in contact area on the opening side between the respective regions of the spherical inner peripheral surface 6 of the outer joint member 2, and a difference in contact area on the interior side between the respective regions of the spherical outer peripheral surface 8 of the inner joint member 3 can be reduced. Thus, the spherical contact portions between the cage 5 and the outer joint member 2, and between the cage 5 and the inner joint member 3 can be arranged in a balanced manner. As a result, further smoother operability can be achieved.

In the fourth embodiment described above, after the ball raceway center line Xb of each of the second track groove portions 7Ab and 7Bb of the outer joint member 2 is connected smoothly to the end portion A on the opening side of the ball raceway center line Xa of each of the first track groove portions 7Aa and 7Ba, the ball raceway center line Xb is gently curved in a manner that the inclination angle γ becomes gradually lower toward the opening side. In this way, the inclination angle γ of 0° is formed near the opening end portion. On the other hand, after the ball raceway center line Yb of the second track groove portions 9Ab and 9Bb of the inner joint member 3 is connected smoothly to the end portion B on the interior side of the ball raceway center line Ya of each of the first track groove portions 9Aa and 9Ba, the ball raceway center line Yb is gently curved in a manner that the inclination angle γ becomes gradually lower toward the interior side. In this way, the inclination angle γ of 0° is formed near the interior end portion. However, the present invention is not limited thereto. Specifically, after the ball raceway center line Xb of each of the second track groove portions 7Ab and 7Bb of the outer joint member 2 is connected to the end portion A on the opening side of the ball raceway center line Xa of each of the first track groove portions 7Aa and 7Ba into a shape of an arc having a relatively small curvature radius, the inclination angle γ of 0° may be formed on the opening side. Similarly, after the ball raceway center line Yb of the second track groove portions 9Ab and 9Bb of the inner joint member 3 is connected to the end portion B on the interior side of the ball raceway center line Ya of each of the first track groove portions 9Aa and 9Ba into a shape of an arc having a relatively small curvature radius, the inclination angle γ of 0° may be formed on the interior side.

In the fixed type constant velocity universal joints according to the embodiments described above, the number of the balls 4 is eight. However, the present invention is not limited thereto. Ten balls are also preferred, and twelve balls may also be appropriately applicable.

Further, the first track groove portions of the fixed type constant velocity universal joints according to the embodiments described above are not limited to a single arc, but may be formed of a plurality of arcs in consideration of the track groove depths and the like. Still further, in the above description, the track grooves are arranged at a regular pitch in the peripheral direction, but the track grooves may be arranged at an irregular pitch. Yet further, in the above description, the inclination angles γ of the first track grooves with respect to the joint axial line N-N are equal to each other in all the track grooves. However, the present invention is not limited thereto. The first track grooves of the outer joint member and the inner joint member may be formed so as to have inclination angles γ that are unequal from pair to pair. That is, it is only necessary that the inclination angles be set so that the axial forces of the balls are applied in a balanced manner as a whole to all the pocket portions of the cage in the peripheral direction. In addition, in the embodiments described above, the track grooves and the balls are held in angular contact at a contact angle. However, the present invention is not limited thereto. The track grooves may be formed into a circular shape in horizontal cross section so that the track grooves and the balls are held in circular contact.

The present invention is not limited to the embodiments described above, and as a matter of course, may be carried out in various other embodiments without departing from the spirit of the present invention. The scope of the present invention is defined in the claims, and encompasses meaning of equivalents of elements described in the claims and all modifications within the scope of claims.

REFERENCE SIGNS LIST 1 fixed type constant velocity universal joint
2 outer joint member
3 inner joint member
4 ball
5 cage
6 spherical inner peripheral surface
7 track groove
7a first track groove portion
7b second track groove portion
8 spherical outer peripheral surface
9 track groove
9a first track groove
9b second track groove
11 shaft
12 spherical outer peripheral surface
13 spherical inner peripheral surface
20 drive shaft
A end portion
B end portion
$f_2$ offset amount
K perpendicular line
L straight line
M plane including ball raceway center line
N joint axial line
O joint center
P joint center plane
Q plane including ball raceway center line
Oo1 curvature center
Oi1 curvature center
$O_{o3}$ curvature center
R straight line
X ball raceway center line
Y ball raceway center line
β angle
γ inclination angle
δ contact angle
θ operating angle
σ allowance amount

The invention claimed is:

1. A fixed type constant velocity universal joint, comprising:
an outer joint member having a spherical inner peripheral surface in which a plurality of track grooves are formed so as to extend in an axial direction of the outer joint member,
the outer joint member having an opening side and an interior side spaced apart from each other in the axial direction;
an inner joint member having a spherical outer peripheral surface in which a plurality of track grooves are formed so as to be paired with the plurality of track grooves of the outer joint member;
a plurality of balls for transmitting torque,
the plurality of balls being interposed between the plurality of track grooves of the outer joint member and the plurality of track grooves of the inner joint member; and
a cage comprising pockets for holding the plurality of balls, the cage having a spherical outer peripheral surface, which is fitted to the spherical inner peripheral surface of the outer joint member, and a spherical inner peripheral surface, which is fitted to the spherical outer peripheral surface of the inner joint member, wherein the plurality of track grooves of the outer joint member comprise:
first track groove portions positioned on the interior side; and
second track groove portions positioned on the opening side, wherein the first track groove portions each have an arc-shaped ball raceway center line having a curvature center that is prevented from being offset in the axial direction with respect to a joint center, wherein each of the first track groove portions has a plane comprising at least the arc-shaped ball raceway center line of the respective first track groove portion and the joint center that is inclined with respect to a joint axial line, and the planes of adjacent pairs of the first track groove portions in a peripheral direction of the outer joint member are inclined in opposite, wherein the second track groove portions each have an arc-shaped ball raceway center line having a curvature center that is offset to a radially outer side with respect to the arc-shaped ball raceway center line of a corresponding one of the first track groove portions, wherein an end portion of the arc-shaped ball raceway center line of each of the first track groove portions is positioned on the opening side with respect to the joint center, wherein a position of the end portion occupies at least 60% of an effective track length on the opening side with respect to the joint center, wherein the arc-shaped ball raceway center line of each of the second track groove portions is connected to the end portion of the arc-shaped ball raceway center line of the corresponding one of the first track groove portions, and wherein a ball raceway center line of each of the plurality of track grooves of the inner joint member is formed so as to be mirror-image symmetrical with a ball raceway center line of a corresponding one of the plurality of track grooves of the outer joint member with respect to another plane comprising the joint center at an operating angle of 0°.

2. The fixed type constant velocity universal joint according to claim 1, wherein
the track grooves of the outer joint member and the track grooves of the inner joint member are formed so that a wedge angle $2\tau'$ in two-dimensional cross section at a maximum operating angle of the fixed type constant velocity universal joint satisfies the following equation:

$(2\tau')\cos \delta + (2\gamma)\sin \delta \leq 43°$ where $\gamma$ is an inclination angle between the plane of one of the track grooves of the outer joint member, including the ball raceway center line and the joint center, and the joint axial line, and between a plane of one of the track grooves of the inner joint member, including the ball raceway center line and the joint center, and the joint axial line, and where $\delta$ is a contact angle between, in a plane perpendicular to the ball raceway center line of the one of the track grooves of the outer joint member, a line passing through a center of one of the balls positioned between the one of the track grooves of the outer joint member and the one of the track grooves of the inner joint member and a bottom line of the one of the track grooves of the outer joint member and a line passing through the center of the one of the balls and a contact point between the one of the balls and the one of the track grooves of the outer joint member, and between, in a plane perpendicular to the ball raceway center line of the one of the track grooves of the inner joint member, a line passing through the center of the one of the balls and a bottom line of the one of the track grooves of the inner joint member and a line passing through the center of the one of the balls and a contact point between the one of the balls and the one of the track grooves of the inner joint member, the two-dimensional cross section is defined as a cross section including the center of the one of the balls, the joint center, the bottom line of the one of the track grooves of the outer joint member, wherein the one of the track grooves of the outer joint member is drawn so that the plane of the one of the track grooves of the outer joint member is turned to the inclination angle $\gamma$ of 0° and the bottom line of the one of the track grooves of the inner joint member, wherein the one of the track grooves of the inner joint member is drawn so that the plane of the one of the track grooves of the inner joint member is turned to the inclination angle $\gamma$ of 0°, the wedge angle $2\tau'$ at the maximum operating angle is defined, in the two-dimensional cross section including the center of the one of the balls positioned at a phase angle $\phi$ of 0° at which the one of the balls is at a furthest position to an open side of the outer joint member, as an angle between a tangent line of the bottom line of the one of the track grooves of the outer joint member at a first intersection point and a tangent line of the bottom line of the one of the track grooves of the inner joint member at a second intersection point, the first intersection point is a point at which a plane perpendicular to the ball raceway center line of the one of the track grooves of the outer joint member and including the center of the one of the balls and the contact point between the one of the balls and the one of the track grooves of the outer joint member intersects the bottom line of the one of the track grooves of the outer joint member, and the second intersection point is a point at which a plane perpendicular to the ball raceway center line of the one of the track grooves of the inner joint member and including the center of the one of the balls and the contact point between the one of the balls and the one of the track grooves of the inner joint member intersects the bottom line of the one of the track grooves of the inner joint member.

3. The fixed type constant velocity universal joint according to claim 1, wherein, at a maximum operating angle of the fixed type constant velocity universal joint, an allowance amount is secured between the spherical outer peripheral surface of the cage and a contact point between one of the plurality of balls and a corresponding one of the pockets of the cage, the one of the plurality of balls being moved to an end of the radially outer side with respect to the corresponding one of the pockets.

4. The fixed type constant velocity universal joint according to claim 1, wherein the curvature center of the arc-shaped ball raceway center line of each of the first track groove portions is arranged on the joint axial line.

5. The fixed type constant velocity universal joint according to claim 1, wherein the curvature center of the arc-shaped ball raceway center line of each of the first track groove portions is offset in a radial direction with respect to the joint axial line.

6. The fixed type constant velocity universal joint according to claim 1, wherein the spherical outer peripheral surface of the cage and the spherical inner peripheral surface of the cage each have a curvature center that is offset in the axial direction with respect to the joint center.

7. The fixed type constant velocity universal joint according to claim 1, wherein the curvature center of the arc-shaped ball raceway center line of each of the second track groove portions is offset further to the opening side with respect to the joint center.

8. The fixed type constant velocity universal joint according to claim 1, wherein the curvature center of the arc-shaped ball raceway center line of each of the second track groove portions is formed at a position out of a corresponding one of the planes, the corresponding one of the planes comprising the arc-shaped ball raceway center line of the corresponding one of the first track groove portions and the joint center.

9. The fixed type constant velocity universal joint according to claim 1, wherein an inclination angle of the arc-shaped ball raceway center line of each of the second track groove portions becomes gradually lower toward the opening side.

10. The fixed type constant velocity universal joint according to claim 1, wherein the plurality of balls for transmitting torque comprise eight balls.

11. The fixed type constant velocity universal joint according to claim 1, wherein an angle formed by a straight line connecting the joint center and the end portion on the opening side of the arc-shaped ball raceway center line of each of the first track groove portions with respect to the another plane comprising the joint center is set to 14° to 16°.

12. The fixed type constant velocity universal joint according to claim 11, wherein
the track grooves of the outer joint member and the track grooves of the inner joint member are formed so that a wedge angle $2\tau'$ in two-dimensional cross section at a maximum operating angle of the fixed type constant velocity universal joint satisfies the following equation:

$$(2\tau')\cos \delta + (2\gamma)\sin \delta \leq 43°$$

where $\gamma$ is an inclination angle between the plane of one of the track grooves of the outer joint member, including the ball raceway center line and the joint center, and the joint axial line, and between a plane of one of the track grooves of the inner joint member, including the ball raceway center line and the joint center, and the joint axial line, and where $\delta$ is a contact angle between, in a plane perpendicular to the ball raceway center line of the one of the track grooves of the outer joint member, a line passing through a center of one of the balls positioned between the one of the track grooves of the outer joint member and the one of the track grooves of the inner joint member and a bottom line of the one of the track grooves of the outer joint member and a line passing through the center of the one of the balls and a contact point between the one of the balls and the one of the track grooves of the outer joint member, and between, in a plane perpendicular to the ball raceway center line of the one of the track grooves of the inner joint member, a line passing through the center of the one of the balls and a bottom line of the one of the track grooves of the inner joint member and a line passing through the center of the one of the balls and a contact point between the one of the balls and the one of the track grooves of the inner joint member, the two-dimensional cross section is defined as a cross section including the center of the one of the balls, the joint center, the bottom line of the one of the track grooves of the outer joint member, wherein the one of the track grooves of the outer joint member is drawn so that the plane of the one of the track grooves of the outer joint member is turned to the inclination angle $\gamma$ of 0°, and the bottom line of the one of the track grooves of the inner joint member, wherein the one of the track grooves of the inner joint member is drawn so that the plane of the one of the track grooves of the inner joint member is turned to the inclination angle $\gamma$ of 0°, the wedge angle $2\tau'$ at the maximum operating angle is defined, in the two-dimensional cross section including the center of the one of the balls positioned at a phase angle $\phi$ of 0° at which the one of the balls is at a furthest position to an open side of the outer joint member, as an angle between a tangent line of the bottom line of the one of the track grooves of the outer joint member at a first intersection point and a tangent line of the bottom line of the one of the track grooves of the inner joint member at a second intersection point, the first intersection point is a point at which a plane perpendicular to the ball raceway center line of the one of the track grooves of the outer joint member and including the center of the one of the balls and the contact point between the one of the balls and the one of the track grooves of the outer joint member intersects the bottom line of the one of the track grooves of the outer joint member, and the second intersection point is a point at which a plane perpendicular to the ball raceway center line of the one of the track grooves of the inner joint member and including the center of the one of the balls and the contact point between the one of the balls and the one of the track grooves of the inner joint member intersects the bottom line of the one of the track grooves of the inner joint member.

13. The fixed type constant velocity universal joint according to claim 11, wherein, at a maximum operating angle of the fixed type constant velocity universal joint, an allowance amount is secured between the spherical outer peripheral surface of the cage and a contact point between one of the plurality of balls and a corresponding one of the pockets of the cage, the one of the plurality of balls being moved to an end of the radially outer side with respect to the corresponding one of the pockets.

14. The fixed type constant velocity universal joint according to claim 11, wherein the curvature center of the arc-shaped ball raceway center line of each of the first track groove portions is arranged on the joint axial line.

15. The fixed type constant velocity universal joint according to claim 11, wherein the curvature center of the arc-shaped ball raceway center line of each of the first track groove portions is offset in a radial direction with respect to the joint axial line.

16. The fixed type constant velocity universal joint according to claim 11, wherein the curvature center of the arc-shaped ball raceway center line of the each of the second track groove portions is offset further to the opening side with respect to the joint center.

17. The fixed type constant velocity universal joint according to claim 11, wherein the curvature center of the arc-shaped ball raceway center line of each of the second track groove portions is formed at a position out of a corresponding one of the planes, the corresponding one of the planes comprising the arc-shaped ball raceway center line of the corresponding one of the first track groove portions and the joint center.

18. The fixed type constant velocity universal joint according to claim 11, wherein an inclination angle of the arc-shaped ball raceway center line of each of the second track groove portions becomes gradually lower toward the opening side.

19. The fixed type constant velocity universal joint according to claim 11, wherein the plurality of balls for transmitting torque comprise eight balls.

* * * * *